United States Patent
Lu et al.

(10) Patent No.: US 11,942,620 B2
(45) Date of Patent: Mar. 26, 2024

(54) SOLID STATE BATTERY WITH UNIFORMLY DISTRIBUTED ELECTROLYTE, AND METHODS OF FABRICATION RELATING THERETO

(71) Applicant: GM Global Technology Operations LLC, Detroit, MI (US)

(72) Inventors: Yong Lu, Shanghai (CN); Zhe Li, Shanghai (CN); Xiaochao Que, Shanghai (CN); Haijing Liu, Shanghai (CN); Meiyuan Wu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 3 days.

(21) Appl. No.: 17/543,160

(22) Filed: Dec. 6, 2021

(65) Prior Publication Data
US 2022/0181598 A1    Jun. 9, 2022

(30) Foreign Application Priority Data
Dec. 7, 2020   (CN) ......................... 202011416215.3

(51) Int. Cl.
*H01M 4/04*   (2006.01)

(52) U.S. Cl.
CPC .. *H01M 4/0416* (2013.01); *H01M 2300/0068* (2013.01)

(58) Field of Classification Search
CPC ....... H01M 4/0416; H01M 2300/0068; H01M 4/13; H01M 10/056; H01M 10/0562; H01M 10/0565; H01M 10/058
See application file for complete search history.

(56) References Cited

U.S. PATENT DOCUMENTS

| 10,714,756 B2 | 7/2020 | Dai et al. |
| 11,121,375 B2 | 9/2021 | Hou et al. |

(Continued)

FOREIGN PATENT DOCUMENTS

| CN | 114597486 A | 6/2022 |
| DE | 102021114604 A1 | 6/2022 |

(Continued)

OTHER PUBLICATIONS

Chen et al, U.S. Appl. No. 17/500,660, filed Oct. 13, 2021, entitled "Solid-State Battery Having a Hybrid Capacitor Material with a Metal-Organic Framework," 62 pages.

(Continued)

*Primary Examiner* — Stewart A Fraser
(74) *Attorney, Agent, or Firm* — Harness, Dickey & Pierce, P.L.C.

(57) ABSTRACT

The present disclosure relates to a solid-state electrochemical cell having a uniformly distributed solid-state electrolyte and methods of fabrication relating thereto. The method may include forming a plurality of apertures within the one or more solid-state electrodes; impregnating the one or more solid-state electrodes with a solid-state electrolyte precursor solution so as to fill the plurality of apertures and any other void or pores within the one or more electrodes with the solid-state electrolyte precursor solution; and heating the one or more electrodes so as to solidify the solid-state electrolyte precursor solution and to form the distributed solid-state electrolyte.

17 Claims, 11 Drawing Sheets

(56) References Cited

U.S. PATENT DOCUMENTS

| | | |
|---|---|---|
| 11,145,922 B2 | 10/2021 | Li et al. |
| 11,205,798 B2 | 12/2021 | Li et al. |
| 11,217,826 B2 | 1/2022 | Li et al. |
| 11,374,257 B2 | 6/2022 | Hou et al. |
| 11,539,071 B2 | 12/2022 | Li et al. |
| 11,575,120 B2 | 2/2023 | Hou et al. |
| 2001/0038944 A1 | 11/2001 | Hack et al. |
| 2001/0041289 A1 | 11/2001 | Hikmet et al. |
| 2012/0077095 A1 | 3/2012 | Roumi et al. |
| 2015/0056520 A1* | 2/2015 | Thokchom .......... H01M 4/0471 429/246 |
| 2016/0118197 A1 | 4/2016 | Chiu et al. |
| 2018/0254508 A1* | 9/2018 | Kim .................... H01M 10/058 |
| 2019/0181492 A1 | 6/2019 | Liu et al. |
| 2020/0036036 A1 | 1/2020 | Mihara et al. |
| 2020/0403267 A1 | 12/2020 | Li et al. |
| 2021/0020929 A1 | 1/2021 | Kong et al. |
| 2021/0028481 A1 | 1/2021 | Hou et al. |
| 2021/0050157 A1 | 2/2021 | Hou et al. |
| 2021/0050596 A1 | 2/2021 | Li et al. |
| 2021/0057776 A1 | 2/2021 | Lu et al. |
| 2021/0111426 A1 | 4/2021 | Li et al. |
| 2021/0135224 A1 | 5/2021 | Hou et al. |
| 2022/0140422 A1 | 5/2022 | Chen et al. |
| 2022/0158249 A1* | 5/2022 | Nogami ............ H01M 10/0585 |
| 2022/0294007 A1* | 9/2022 | Ueno ................ H01M 10/0562 |

FOREIGN PATENT DOCUMENTS

| | | |
|---|---|---|
| JP | H1021963 A | 1/1998 |
| JP | 2000090979 A | 3/2000 |
| JP | 2012195182 A | 10/2012 |
| JP | 2015195144 A | 11/2015 |
| JP | 6316066 B2 | 4/2018 |
| KR | 20150143365 A | 12/2015 |
| KR | 20200050627 A | 5/2020 |
| WO | WO-02103835 A1 | 12/2002 |

OTHER PUBLICATIONS

First Office Action for Chinese Patent Application No. 202011416215.3 dated Nov. 15, 2023, with correspondence from China Patent Agent (H.K.) Ltd. summarizing Office Action; 9 pages.

* cited by examiner

SOLID STATE BATTERY WITH UNIFORMLY DISTRIBUTED ELECTROLYTE, AND METHODS OF FABRICATION RELATING THERETO

CROSS-REFERENCE TO RELATED APPLICATIONS

This application claims the benefit and priority of Chinese Application No. 202011416215.3, filed Dec. 7, 2020. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("p BAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. Lithium-ion batteries may also include various terminal and packaging materials. Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions between the electrodes and, like the two electrodes, may be in a solid form, a liquid form, or a solid-liquid hybrid form. In the instances of solid-state batteries, which include solid-state electrolyte layers disposed between solid-state electrodes, the solid-state electrolyte layer physically separates the solid-state electrodes so that a distinct separator is not required.

Solid-state batteries have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, solid-state batteries generally experience comparatively low power capabilities. For example, such low power capabilities may be a result of high interfacial resistance caused by limited solid-state contacts between the solid-state active particles and the solid-state electrolyte particles within the electrodes and/or contacts between the solid-state electrolyte particles within the solid-state electrolyte layer. Accordingly, it would be desirable to develop high-performance solid-state battery materials and methods that improve contacts between the solid-state active particles and the solid-state electrolyte particles in the electrodes and/or the contacts between the solid-state electrolyte particles in the solid-state electrolyte layer.

SUMMARY

This section provides a general summary of the disclosure, and is not a comprehensive disclosure of its full scope or all of its features.

The present disclosure relates to a solid-state electrochemical cell having a uniformly distributed solid-state electrolyte and methods of fabrication relating thereto.

In various aspects, the present disclosure provides a method for preparing a solid-state electrochemical cell having one or more solid-state electrodes and a distributed solid-state electrolyte. The method includes forming a plurality of apertures within the one or more solid-state electrodes; impregnating the one or more solid-state electrodes with a solid-state electrolyte precursor solution so as to fill the plurality of apertures and any other void or pores within the one or more electrodes with the solid-state electrolyte precursor solution; and heating the one or more electrodes so as to solidify the solid-state electrolyte precursor solution and to form the distributed solid-state electrolyte.

In one aspect, the solid-state electrolyte precursor solution includes one or more solid-state electrolyte materials homogeneously distributed in solution. The one or more solid-state electrolyte materials may include one or more sulfide solid-state electrolytes, halide-based solid-state electrolytes, polymer-based solid-state electrolytes, and combinations thereof.

In one aspect, the one or more sulfide solid-state electrolyte may be selected from the group consisting of: $Li_3PS_4$, $Li_7P_3S_{11}$, $Li_4SnS_4$, $80Li_2S.20P_2S_5$, $Li_{3.25}Ge_{0.25}P_{0.75}S_4$, $Li_6PS_5Br$, $Li_6PS_5Cl$, $Li_7P_2S_8I$, $Li_4PS_4I$, $LiI$—$Li_4SnS_4$, $Li_{9.54}Si_{1.74}P_{1.44}S_{11.7}Cl_{0.3}$, $Li_{10.35}[Sn_{0.27}Si_{1.08}]P_{1.65}S_{12}$, and combinations thereof. The one or more halide-based solid-state electrolytes may be selected from the group consisting of: $LiI$, $Li_2CdCl_4$, $Li_2MgCl_4$, $Li_2CdI_4$, $Li_2ZnI_4$, $Li_3OCl$, and combinations thereof. The one or more polymer-based solid-state electrolytes may be selected from the group consisting of: polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), and combinations thereof.

In one aspect, the one or more electrodes may be heated to a temperature greater than or equal to about 50° C. to less than or equal to about 300° C.

In one aspect, the method may further include preparing the one or more electrodes. Preparing the electrodes may include disposing a solid-state electroactive material layer adjacent to a current collector. The solid-state electroactive material layer may include a plurality of solid-state electroactive particles.

In one aspect, the plurality of apertures may extend continuously through the solid-state electroactive material layer and the current collector.

In one aspect, the method may further include forming a solid-state electrolyte layer on an exposed surface of the solid-state electroactive material layer. The solid-state electrolyte layer may be formed by a plurality of solid-state electrolyte particle and the solid-state electrolyte layer may also be impregnated with the solid-state electrolyte precursor solution.

In one aspect, the plurality of apertures may extend continuously through solid-state electrolyte layer, the solid-state electroactive material layer, and the current collector.

In one aspect, the one or more electrodes may include at least one positive electrode and at least one negative electrode and the method may further include stacking the at least one positive electrode and the at least one negative electrode so as to form the solid-state electrochemical cell. Any void or pore within the solid-state electrochemical cell may also impregnated with the solid-state electrolyte precursor solution.

In one aspect, a separator may be disposed between the at least one positive electrode and the at least one negative electrode. The separator may also be impregnated with the solid-state electrolyte precursor solution.

In one aspect, a solid-state electrolyte layer may be disposed between the separator and the at least one positive electrode. The solid-state electrolyte layer may be formed by a plurality of solid-state electrolyte particle and the solid-state electrolyte layer may also impregnated with the solid-state electrolyte precursor solution.

In one aspect, a solid-state electrolyte layer may be disposed between the separator and the at least one negative electrode. The solid-state electrolyte layer may be formed by a plurality of solid-state electrolyte particle and the solid-state electrolyte layer may also impregnated with the solid-state electrolyte precursor solution.

In one aspect, a first solid-state electrolyte layer may be disposed adjacent to the at least one positive electrode and a second solid-state electrolyte layer may be disposed adjacent to the at least one negative electrode. The first and second solid-state electrolyte layers may also impregnated with the solid-state electrolyte precursor solution. The first solid-state electrolyte layer may include a first plurality of solid-state electrolyte particles. The second solid-state electrolyte layer may include a second plurality of solid-state electrolyte particles. The first plurality of solid-state electrolyte particles may be the same or different from the second plurality of solid-state electrolyte particles.

In one aspect, the plurality of apertures may include a first plurality of apertures that extends continuously through the first solid-state electrolyte layer and the at least one positive electrode; and a second plurality of apertures that extends continuously through the second solid-state electrolyte layer and the at least one negative electrode.

In one aspect, a separator may be disposed between the first solid-state electrolyte layer and the second solid-state electrolyte layer. The separator may also be impregnated with the solid-state electrolyte precursor solution.

In various other aspects, the present disclosure provides a method for preparing a solid-state electrochemical cell having a distributed solid-state electrolyte. The method may include disposing a first solid-state electroactive material layer adjacent a first current collector so as to form a first electrode, forming a first plurality of apertures within the first electrode, disposing a second solid-state electroactive material layer adjacent a second current collector so as to second electrode, forming a second plurality of apertures within the second electrode, stacking the first and second electrodes so as to form the solid-state electrochemical cell, impregnating the solid-state electrochemical cell with an solid-state electrolyte precursor solution so as to fill the first and second pluralities of apertures and any other void or pore within the solid-state electrochemical cell with the solid-state electrolyte precursor solution, and heating the solid-state electrolyte precursor solution so as to solidify the solid-state electrolyte precursor solution and to form the distributed solid-state electrolyte. The first plurality of apertures may extend continuously through the first solid-state electroactive material layer and the first current collector. The second plurality of apertures may extend continuously through the second solid-state electroactive material layer and the second current collector.

In one aspect, one or more solid-state electrolyte layers may be disposed between the first electrode and the second electrode. Each of the one or more solid-state electrolyte layers may be formed by a plurality of solid-state electrolyte particle. The one or more solid-state electrolyte layers may also be impregnated with the solid-state electrolyte precursor solution.

In one aspect, the one or more solid-state electrolyte layers may include a first solid-state electrolyte layer disposed adjacent to an exposed surface of the first solid-state electroactive material layer, and a second solid-state electrolyte layer disposed adjacent to an exposed surface of the second solid-state electroactive material layer. The first plurality of apertures may extend continuously through the first solid-state electroactive material layer, the first current collector, and the first solid-state electrolyte layer. The second plurality of apertures may extend continuously through the second solid-state electroactive material layer, the second current collector, and the second solid-state electrolyte layer.

In one aspect, a separator may be disposed between the first electrode and the second electrode. The separator may also be impregnated with the solid-state electrolyte precursor solution.

In various other aspects, the present disclosure provides a solid-state electrochemical cell. The solid-state electrochemical cell may include a solid-state positive electrode, a solid-state negative electrode, and a separator disposed between the solid-state positive electrode and the solid-state negative electrode. The positive electrode may include a positive electroactive material layer disposed adjacent to a positive current collector and a first solid-state electrolyte layer disposed adjacent to an exposed surface of the positive electroactive material layer. A first plurality of apertures may extend continuous through the positive current collector, the positive electroactive material layer, and the first solid-state electrolyte layer. The negative electrode may include a negative electroactive material layer disposed adjacent to a negative current collector and a second solid-state electrolyte layer disposed adjacent to an exposed surface of the negative electroactive material layer. A second plurality of apertures may extend continuously through the negative current collector, the negative electroactive material layer, and the second solid-state electrolyte layer. A sulfide-based solid-state electrolyte may be evenly distributed within the first and second pluralities of apertures, the separator, and any other void within the solid-state electrochemical cell.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
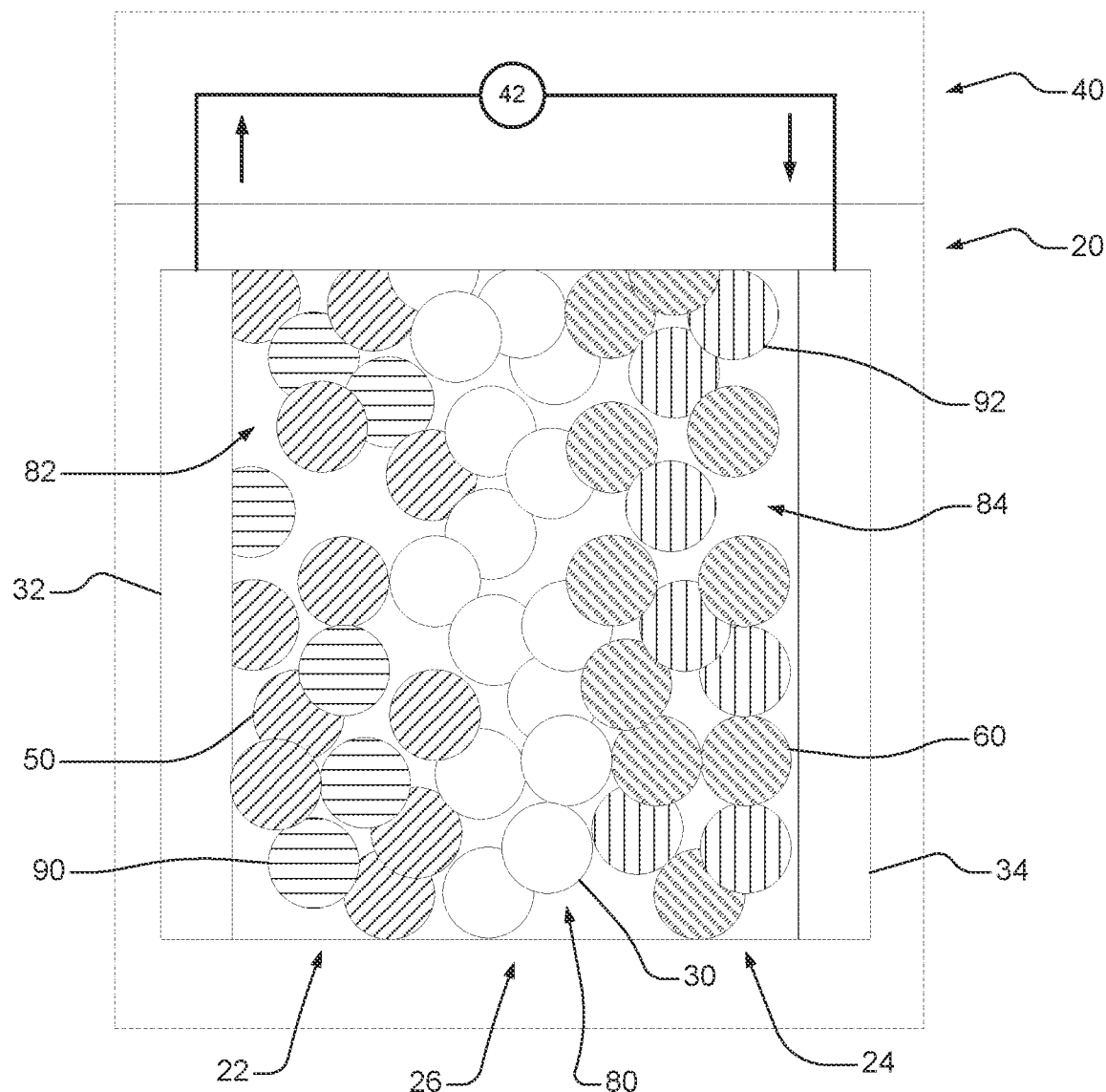
FIG. 1A is a schematic of an example solid-state electrochemical battery cell.
Figure 2A:
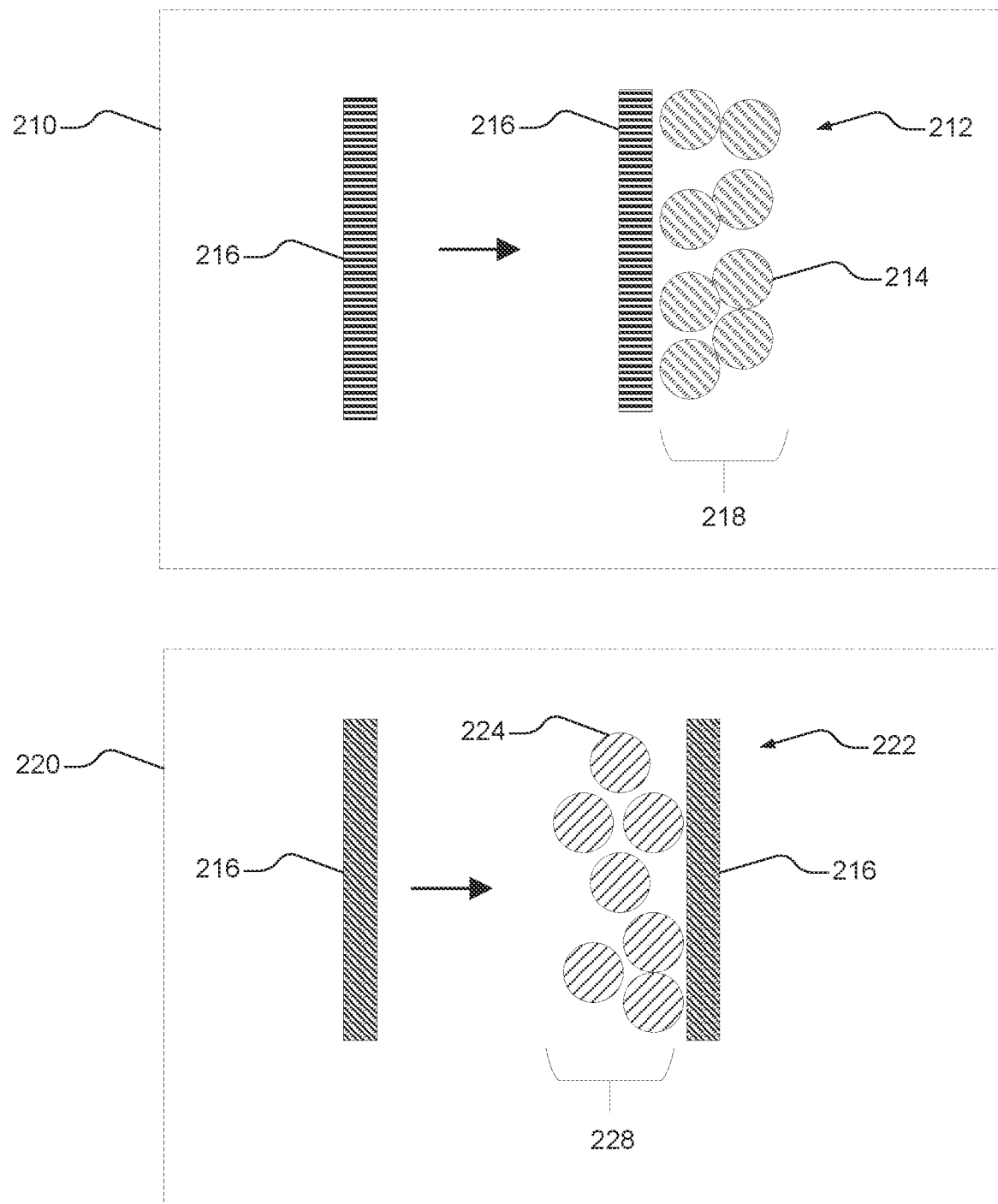
FIGS. 2A-2F are illustrations of an example method for forming an electrochemical battery cell having a substantially uniform distribution of a solid-state electrolyte in accordance with various aspects of the present disclosure.
Figure 2B:
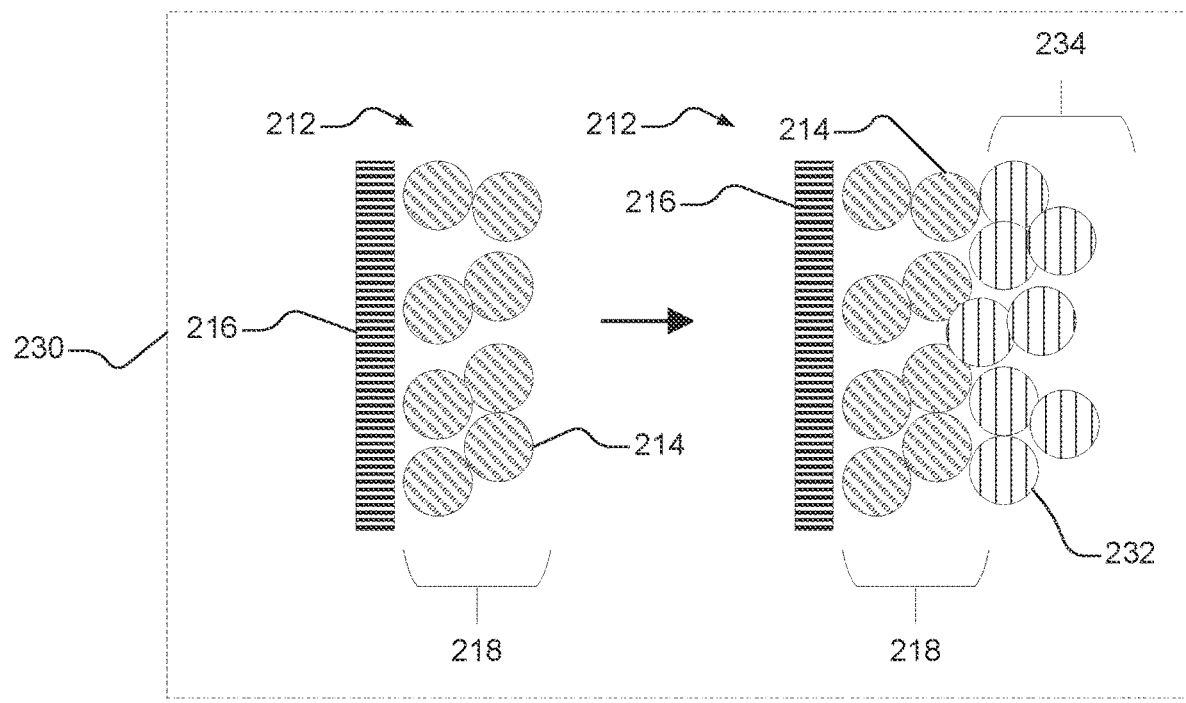
Figure 2B:
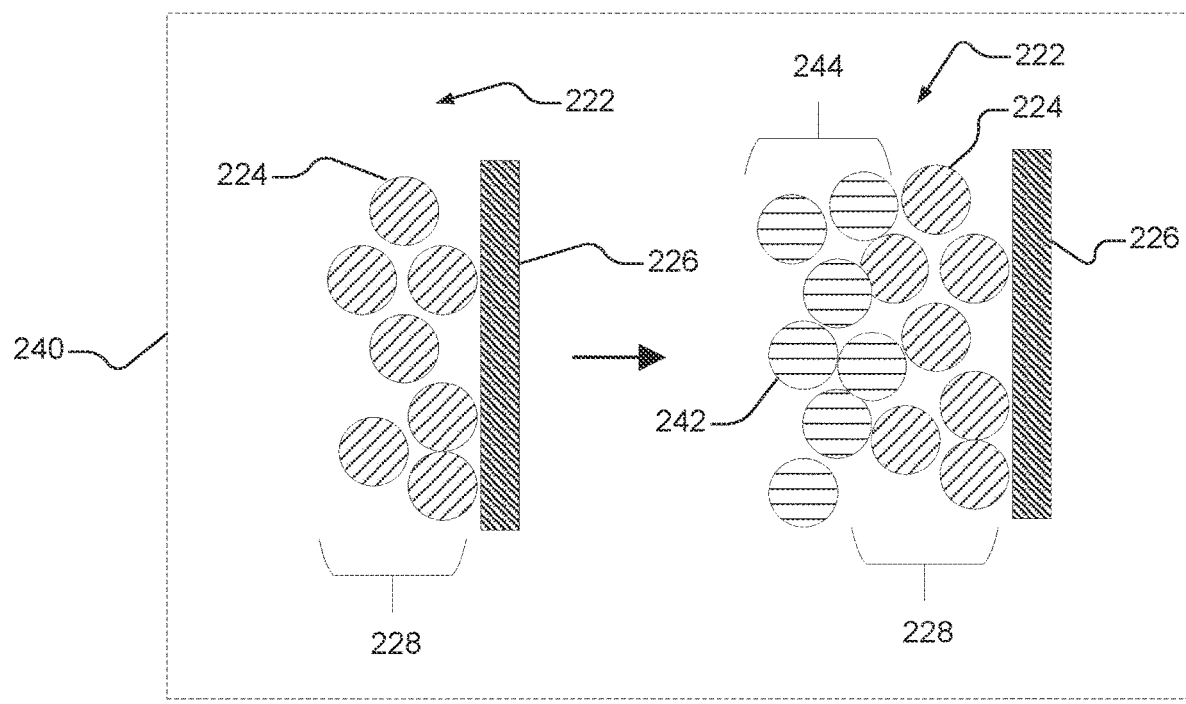
Figure 2C:
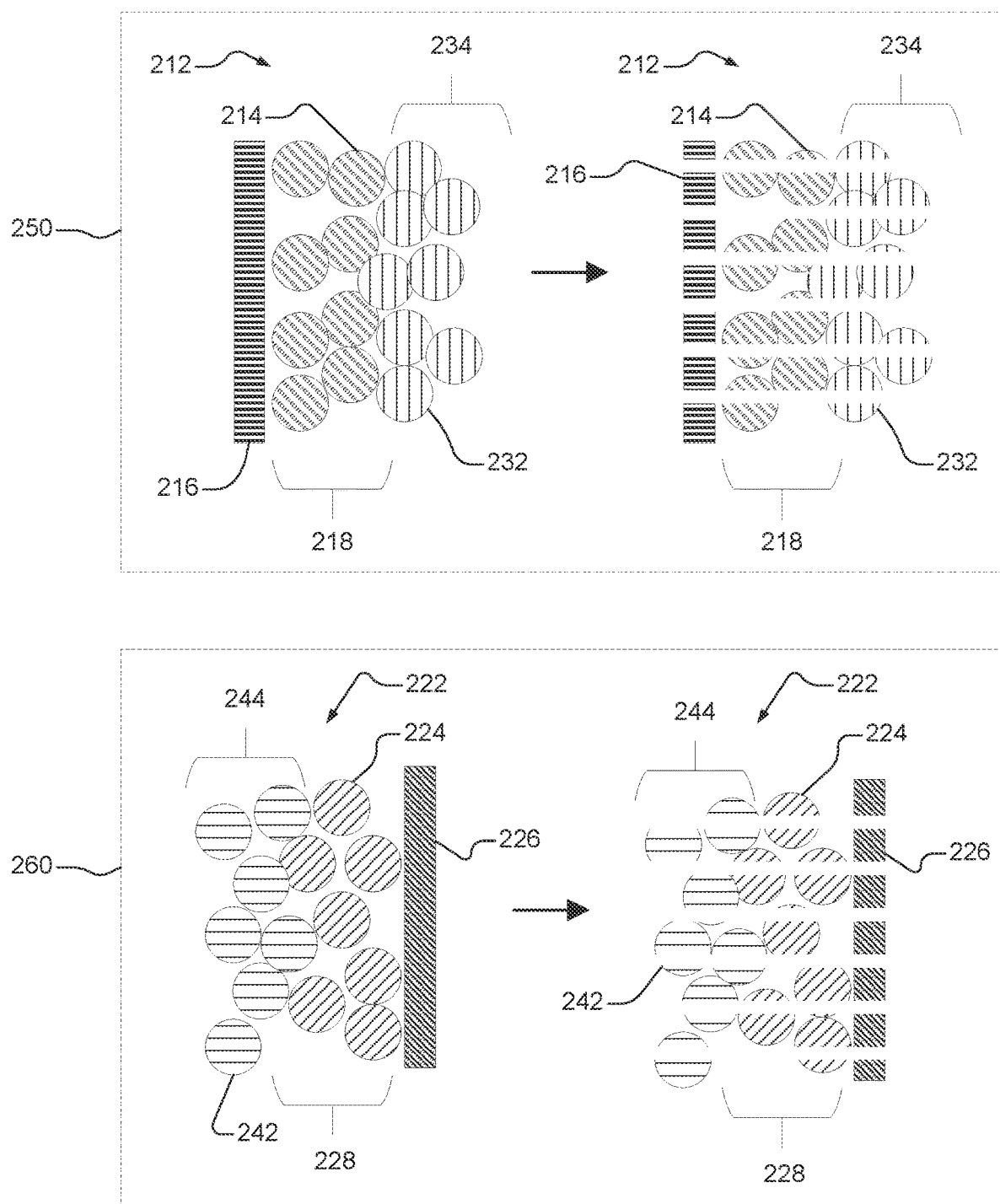
Figure 2D:
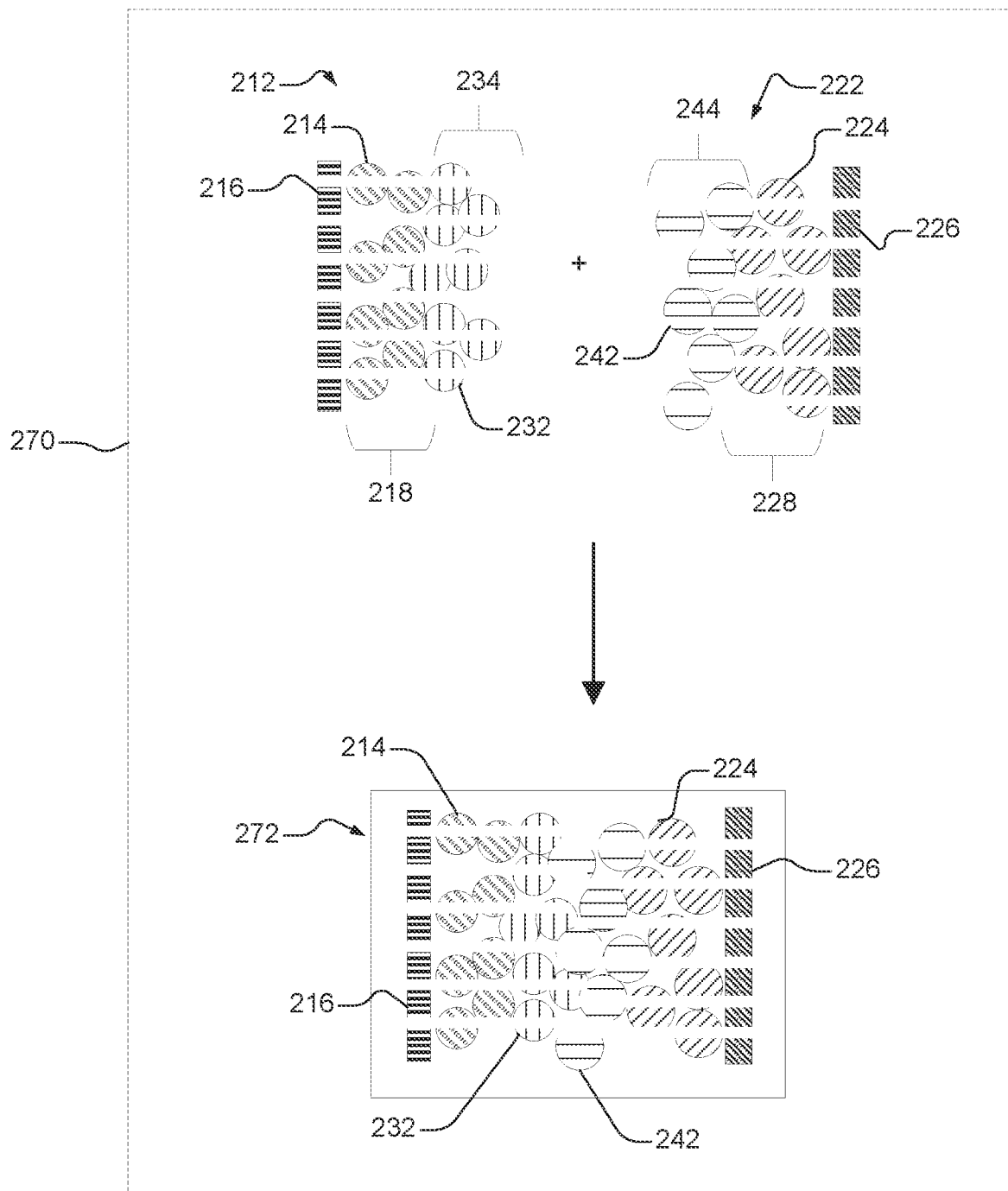
Figure 2E:
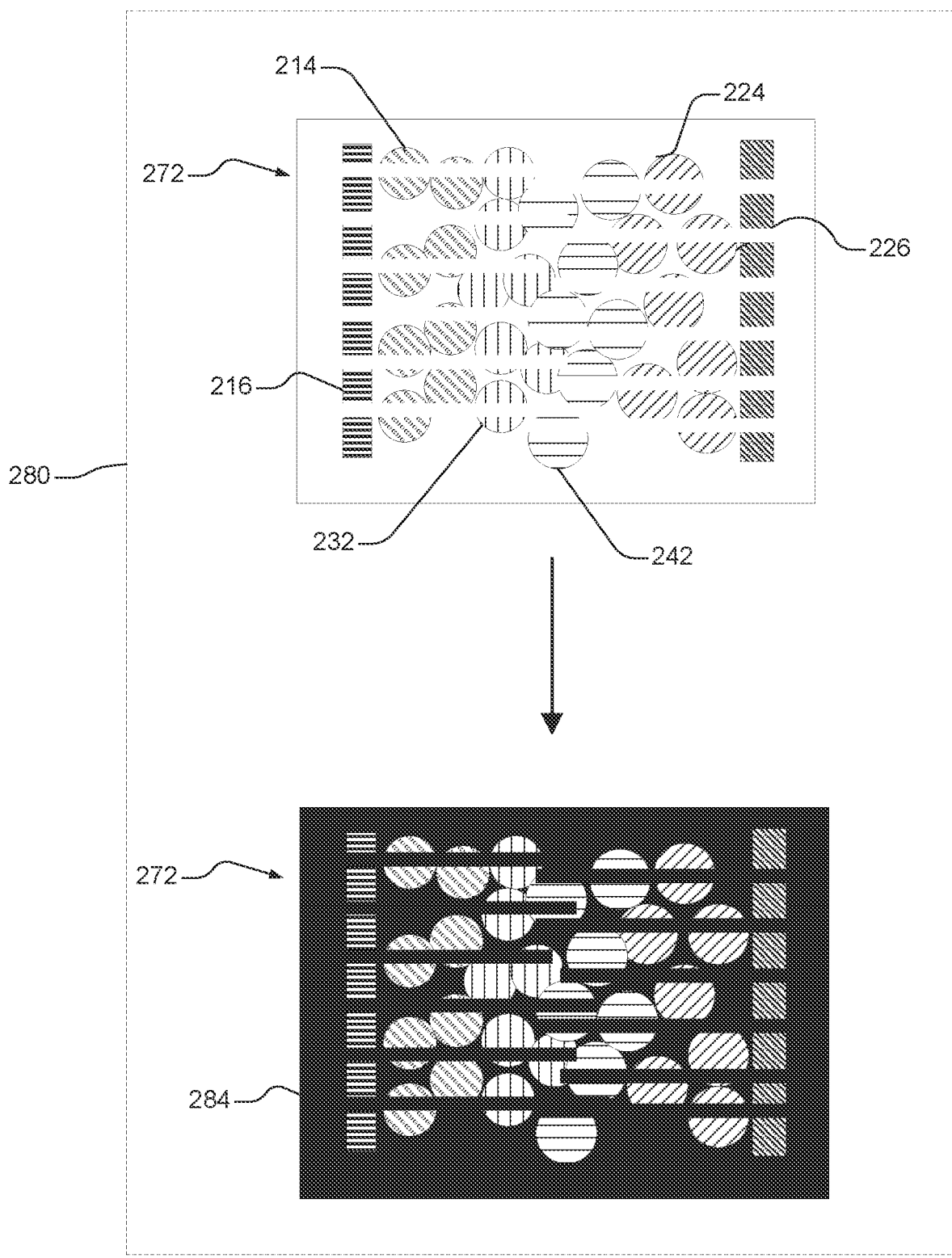
Figure 2F:
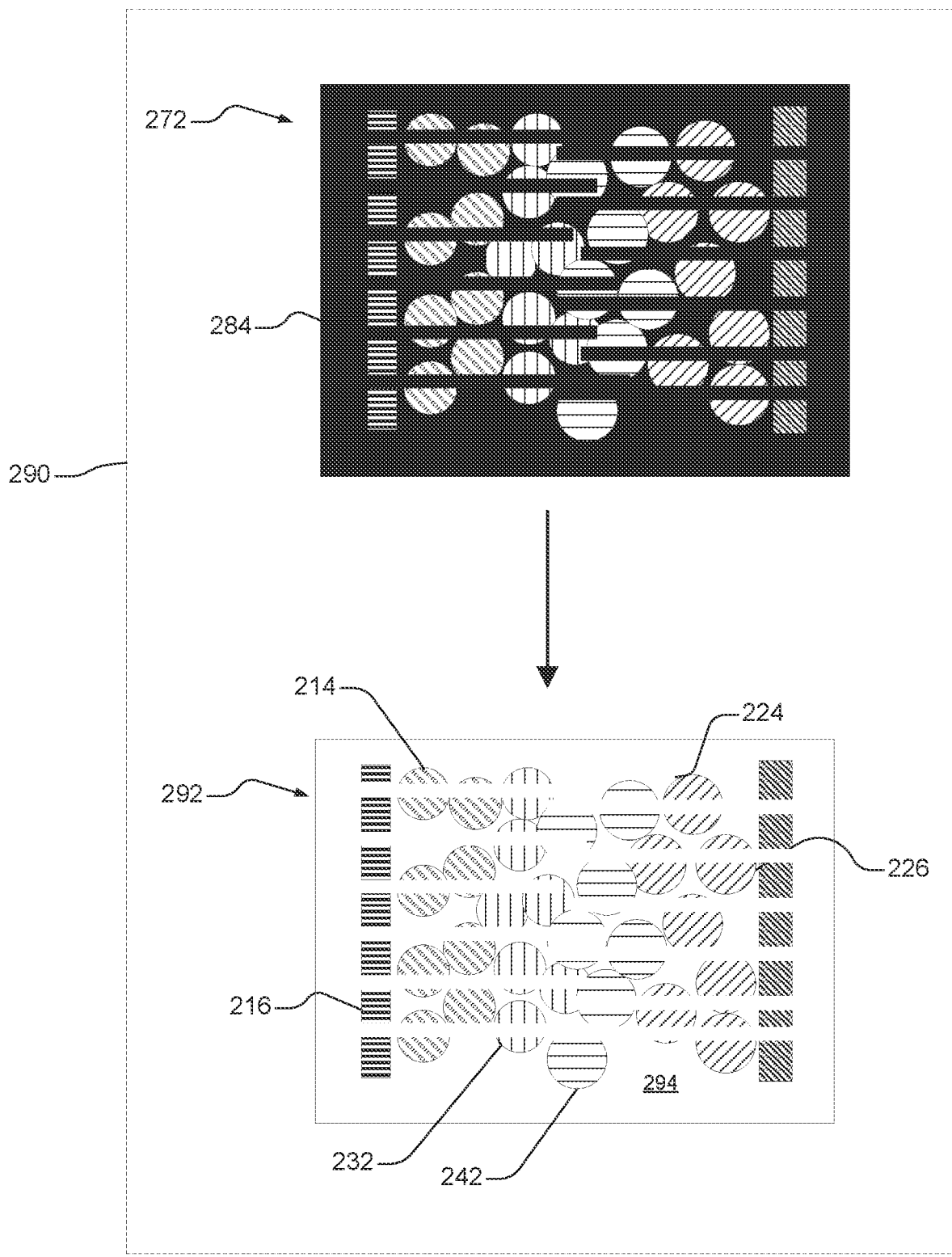

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

By way of non-limiting background, a typical solid-state lithium-ion battery (e.g., solid-state electrochemical cell that cycles lithium ions) includes a first solid-state electrode (such as, a positive electrode or cathode) opposing a second solid-state electrode (such as, a negative electrode or anode) and a separator and/or solid-state electrolyte disposed therebetween. Often, in a lithium-ion battery pack, batteries or cells may be electrically connected in a stack or winding configuration to increase overall output. Lithium-ion batteries operate by reversibly passing lithium ions between the first and second solid-state electrodes. For example, lithium ions may move from a positive solid-state electrode to a negative solid-state electrode during charging of the battery, and in the opposite direction when discharging the battery. The solid-state electrolyte is suitable for conducting lithium ions (or sodium ions in the case of sodium-ion batteries, and the like). For example, exemplary and schematic illustration of a all solid-state electrochemical cell (also referred to as a battery) 20 is shown in FIG. 1.

Such cells are used in vehicle or automotive transportation applications (e.g., motorcycles, boats, tractors, buses, motorcycles, mobile homes, campers, and tanks). However, the current technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples include a single solid-state cathode and a single solid-state anode, the skilled artisan will recognize that the current teaching extend to various other configurations, including those having one or more cathodes and one or more anodes, as well as various current collectors with solid-state electroactive layers disposed on or adjacent to one or more surfaces thereof.

As illustrated in FIG. 1, the solid-state battery ("SSB") 20 includes a solid-state negative electrode 22 (e.g., anode), a solid-state positive electrode 24 (e.g., cathode), and a separator 26 disposed between the two electrodes 22, 24. In various aspects, the separator 26 may be a solid-state electrolyte ("SSE"). For example, as illustrated, the separator 26 may be a solid-state electrolyte comprising a plurality of solid-state electrolyte particles 30 that may, in certain aspects, also be present in the negative electrode 22 and/or the positive electrode 24. The negative solid-state electroactive particles 50 and the positive solid-state electroactive particles 60 can be independently mixed with the second/third plurality of solid-state electrolyte particles 90, 92. For example, as illustrated, the negative electrode 22 can include a second plurality of solid-state electrolyte particles 90 and/or the positive electrode 24 can include a third plurality of solid-state electrolyte particles 92 so as to form a continuous ionic network, which may be a continuous solid-state electrolyte network. The second and third pluralities can be the same or different from the first plurality of solid-state electrolyte particles 30 and the second plurality of solid-state electrolyte particles can be the same or different from the third plurality of solid-state electrolyte particles.

A negative electrode current collector 32 may be positioned at or near the negative electrode 22, and a positive electrode current collector 34 may be positioned at or near the positive electrode 24. The negative electrode current collector 32 may be a metal foil, metal grid or screen, or expanded metal comprising copper or any other appropriate electrically conductive material known to those of skill in the art. The positive electrode current collector 34 may be a metal foil, metal grid or screen, or expanded metal comprising aluminum or any other appropriate electrically conductive material known to those of skill in the art. The negative electrode current collector 32 and the positive electrode current collector 34 respectively collect and move free electrons to and from an external circuit 40. For example, an interruptible external circuit 40 and a load device 42 may connect the negative electrode 22 (through the negative electrode current collector 32) and the positive electrode 24 (through the positive electrode current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 towards the positive electrode 24. Lithium ions that are also produced at the negative electrode 22 are concurrently transferred through the electrolyte 30 contained in the separator 26 towards the positive electrode 24. The electrons flow through the external circuit 40 and the lithium ions migrate across the separator 26 containing the solid-state electrolyte 30 to form intercalated lithium at the positive electrode 24. As noted above, electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source (e.g., charging device) to the lithium ion battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the solid-state electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

In many lithium-ion battery configurations, each of the negative electrode current collector 32, negative electrode 22, separator 26, positive electrode 24, and positive electrode current collector 34 are prepared as relatively thin layers (for example, from several microns to a fraction of a millimeter or less in thickness) and assembled in layers connected in electrical parallel arrangement to provide a suitable electrical energy and power package. In various other instances, the battery 20 may include electrodes 22, 24 connected in series.

The battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26.

As noted above, the size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be fully or partially powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the solid-state electrolyte layer (e.g., separator) 26 provides electrical separation—preventing physical contact—between the negative electrode 22 (i.e., an anode) and the positive electrode 24 (i.e., a cathode). The solid-state electrolyte layer 26 also provides a minimal resistance path for internal passage of ions. In various aspects, as noted above, the solid-state electrolyte layer 26 may be defined by a (first) plurality of solid-state electrolyte particles 30 having an average particle diameter greater than or equal to about 0.01 μm to less than or equal to about 100 μm, and in certain aspects, optionally greater than or equal to about 0.02 μm to less than or equal to about 10 μm.

For example, the solid-state electrolyte layer 26 may be in the form of a layer or a composite that comprises the plurality of solid-state electrolyte particles 30. Though not illustrated, the skilled artisan will recognized that in certain instances, one or more binder particles may be mixed with the solid-state electrolyte particles 30. For example, in certain aspects the solid-state electrolyte layer 26 may include greater than or equal to about 0 wt. % to less than or equal to about 20 wt. %, and in certain aspects, optionally greater than or equal to about 0.5 wt. % to less than or equal to about 10 wt. % of the one or more binder. The one or more binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), and lithium polyacrylate (LiPAA).

The solid-state electrolyte layer 26 may be in the form of a layer having a thickness greater than or equal to about 2 μm to less than or equal to about 200 μm, optionally greater than or equal to about 2 μm to less than or equal to about 100 μm, optionally about 40 μm, and in certain aspects, optionally about 20 μm. Such solid-state electrolyte layers 26 may have, as illustrated in FIG. 1, an interparticle porosity 80 (defined herein as a fraction of the total volume of pores over the total volume of the layer or film being described) between the first plurality of solid-state electrolyte particles 30 that is greater than 0 vol. % to less than or equal to about 50 vol. %, greater than or equal to about 10 vol. % to less than or equal to about 50 vol. %, or greater than or equal to about 20 vol. % to less than or equal to about 40 vol. %.

The first plurality of solid-state electrolyte particles 30 (as well as the second plurality of solid-state electrolyte particles 90 and/or the third plurality of solid-state electrolyte particles 92) may comprise one or more solid-state electrolyte materials that are high-temperature (e.g., >150° C.) stable. For example, the first plurality of solid-state electrolyte particles 30 may comprise one or more: oxide-based particles ("O-SSE"), metal-doped or aliovalent-substituted oxide particles, nitride-based particles, hydride-based particles, halide-based particles, borate-based particles, and/or phosphate-based particles, as well as other air-stable particles (such as, for example only, $Li_{3.88}Sn_{0.833}As_{0.166}S_4$, $LiI-Li_4SnS_4$, and/or $Li_4SnS_4$) and/or other oxide ceramic powders (such as $SiO_2$, $CeO_2$, $Al_2O_3$, $ZrO_2$).

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where 0≤x≤2), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) substituted $Li_7La_3Zr_2O_{12}$, chromium (Cr) and/or vanadium (V) substituted $LiSn_2P_3O_{12}$, an aluminum (Al) substituted perovskite, aluminum (Al) substituted $Li_{1+x+y}Al_xTi_{2-x}Si_yP_{3-y}O_{12}$ (where 0<x<2 and 0<y<3), and combinations thereof.

In certain variations, the nitride-based particles may include, for example only, $Li_3N$, $Li_7PN_4$, $LiSi_2N_3$, and combinations thereof, the hydride-based particles may include, for example only, LiBH$_4$, LiBH$_4$—LiX (where x=Cl, Br, or I), LiNH$_2$, Li$_2$NH, LiBH$_4$—LiNH$_2$, Li$_3$AlH$_6$, and combinations thereof, the halide-based particles may include, for example only, LiI, Li$_3$InCl$_6$, Li$_2$CdCl$_4$, Li$_2$MgCl$_4$, Li$_2$CdI$_4$, Li$_2$ZnI$_4$, Li$_3$OCl, and combinations thereof, the borate-based particles may include, for example only, Li$_2$B$_4$O$_7$, Li$_2$O—B$_2$O$_3$—P$_2$O$_5$, and combinations thereof, and the phosphate-based particles may include, for example only, Li$_3$PO$_4$, LiPON (Li$_{2.88}$PO$_{3.73}$N$_{0.14}$), and combinations thereof.

The negative electrode 22 may be formed from a lithium host material that is capable of functioning as a negative terminal of a lithium-ion battery. For example, in certain variations, the negative electrode 22 may be defined by a plurality of the negative solid-state electroactive particles 50. In certain instances, as illustrated, the negative electrode 22 is a composite comprising a mixture of the negative solid-state electroactive particles 50 and the second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50; and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90.

Such negative electroactive material particles 50 (and second plurality of solid-state electrolyte particles 90 and/or other electrode additives) may be disposed in one or more layers so as to define the three-dimensional structure of the negative electrode 22. The negative electrode 22 may have a thickness greater than or equal to about 1 μm to less than or equal to about 1000 μm, and in certain aspects, optionally greater than or equal to about 10 μm to less than or equal to about 500 μm. The negative electrodes 22 may have an interparticle porosity 82 between the negative solid-state electroactive particles 50 (and/or the second plurality of solid-state electrolyte particles 90 and/or other electrode additives) that is greater than or equal to about 10 vol. % to less than or equal to about 50 vol. %, and in certain aspects, optionally greater than or equal to about 20 vol. % to less than or equal to about 40 vol. %.

As noted above, the second plurality of solid-state electrolyte particles 90 may be the same as or different from the first plurality of solid-state electrolyte particles 30. In certain variations, the negative electrode 22 may be a carbonaceous anode and the negative solid-state electroactive particles 50 may comprise one or more negative electroactive materials, such as graphite, graphene, hard carbon, soft carbon, and carbon nanotubes (CNTs). In other variations, the negative solid-state electroactive particles 50 may be silicon-based comprising, for example, a silicon alloy and/or silicon-graphite mixture. In still other variations, the negative solid-state electroactive particles 50 may be lithium-based, for example, a lithium metal and/or lithium alloy (such as lithium-indium alloys (Li—In)). In still further variations, the negative electrode 22 may comprise one or more negative electroactive materials, such as lithium titanium oxide (Li$_4$Ti$_5$O$_{12}$); one or more metal oxides, such as TiO$_2$ and/or V$_2$O$_5$; and metal sulfides, such as FeS. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and combinations thereof.

In certain variations, the negative electrode 22 may further include one or more electrode additives, including for example only, conductive additives and/or binder materials. For example, the negative solid-state electroactive particles 50 (and/or second plurality of solid-state electrolyte particles 90) may be optionally intermingled with one or more electrically conductive materials (not shown) that provide an electron conduction path and/or at least one polymeric binder material (not shown) that improves the structural integrity of the negative electrode 22. For example, the negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The negative solid-state electroactive particles 50 (and/or second plurality of solid-state electrolyte particles 90) may be optionally intermingled with binders, such as sodium carboxymethyl cellulose (CMC), polyvinylidene difluoride (PVDF), polytetrafluoroethylene (PTFE), ethylene propylene diene monomer (EPDM) rubber, nitrile butadiene rubber (NBR), styrene-butadiene rubber (SBR), styrene ethylene butylene copolymers (SEBS), styrene butadiene styrene copolymers (SBS), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as, graphene oxide), carbon black (such as, Super P), and the like. In certain aspects, mixtures of the conductive additives and/or binder materials may be used.

The positive electrode 24 may be formed from a lithium-based or electroactive material that can function as the positive terminal of the battery 20. For example, in certain variations, the positive electrode 24 may be defined by a plurality of the positive solid-state electroactive particles 60. In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92.

Such positive electroactive material particles 60 (and third plurality of solid-state electrolyte particles 20 and/or other electrode additives) may be disposed in one or more layers so as to define the three-dimensional structure of the positive electrode 24. The positive electrode 24 may have a thickness greater than or equal to about 1 μm to less than or equal to about 1000 μm, and in certain aspects, optionally greater than or equal to about 10 μm to less than or equal to about 500 μm. Such positive electrodes 24 may have an interparticle porosity 84 between the positive solid-state electroactive particles 60 (and/or the third plurality of solid-state electrolyte particles 92 and/or other electrode additives) that is greater than or equal to about 10 vol. % to less than or equal to about 50 vol. %, and in certain aspects, optionally greater than or equal to about 20 vol. % to less than or equal to about 40 vol. %.

As noted above, the third plurality of solid-state electrolyte particles 92 may be the same as or different from the first and/or second pluralities of solid-state electrolyte particles 30, 90. In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_xMn_yCo_{1-x-y}O_2$ (where $0 \leq x \leq 1$ and $0 \leq y \leq 1$), $LiNi_xMn_yAl_{1-x-y}O_2$ (where $0 \leq x \leq 1$ and $0 \leq y \leq 1$), $LiNi_xMn_{1-x}O_2$ (where $0 \leq z \leq 1$), and $Li_{1+x}MO_2$ (where $0 \leq x \leq 1$) for solid-state lithium-ion batteries. The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may comprise one or more positive electroactive materials selected from the group consisting of $LiCoO_2$, $LiNi_xMn_yCo_{1-x-y}O_2$ (where $0 \leq x \leq 1$ and $0 \leq y \leq 1$), $LiNi_xMn_{1-x}O_2$ (where $0 \leq x \leq 1$), $Li_{1+x}MO_2$ (where $0 \leq x \leq 1$), $LiMn_2O_4$, $LiNi_xMn_{1.5}O_4$, $LiFePO_4$, $LiVPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In certain variations, the positive electrode 24 may further include one or more electrode additives, including for example only, conductive additives and/or binder materials. For example, the positive solid-state electroactive particles 60 (and/or third plurality of solid-state electrolyte particles 92) may be optionally intermingled with one or more electrically conductive materials (not shown) that provide an electron conduction path and/or at least one polymeric binder material (not shown) that improves the structural integrity of the positive electrode 24. For example, the positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive solid-state electroactive particles 60 (and/or third plurality of solid-state electrolyte particles 92) may be optionally intermingled with binders, like sodium carboxymethyl cellulose (CMC), polyvinylidene difluoride (PVDF), polytetrafluoroethylene (PTFE), ethylene propylene diene monomer (EPDM) rubber, nitrile butadiene rubber (NBR), styrene-butadiene rubber (SBR), styrene ethylene butylene copolymers (SEBS), styrene butadiene styrene copolymers (SBS), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. In certain aspects, mixtures of the conductive additives and/or binder materials may be used.

As a result of the interparticle porosity (such as interparticle porosities 80, 82, 84) between particles within the battery 20 (for example, the battery 20 in a green form may have a solid-state electrolyte interparticle porosity greater than or equal to about 10 vol. % to less than or equal to about 50 vol. %, and in certain aspects, optionally greater than or equal to about 20 vol. % to less than or equal to about 40 vol. %), direct contact between the solid-state electroactive particles 50, 60 and the pluralities of solid-state electrolyte particles 30, 90, 92 may be much lower than the contact between solid-state electroactive particles and a liquid electrolyte in comparable non-solid-state batteries. Accordingly, it is desirable to develop high-performance solid-state battery designs and fabrication methods that improve the contacts between the solid-state active particles and the solid-state electrolyte particles within the electrodes and/or the contacts between the solid-state electrolyte particles within the solid-state electrolyte layer.

In various aspects, the present disclosure provides example methods for forming electrochemical battery cells having uniformly distributed solid-state electrolytes. Homogenous distributions of solid-state electrolytes improve contact between the respective solid-state electroactive material particles and the solid-state electrolytes (e.g., electrode-electrolyte interfaces) so as to improve power capabilities of such solid-state batteries, as well as decreases the required amount of the solid-state electrolytes. The methods may generally include concurrently or subsequently assembling independent electrodes; creating apertures through the respective electrodes; assembling a stack (e.g., battery) using the respective electrodes including the newly created apertures; impregnating the stack with a solid-state electrolyte precursor, wherein the completed stack has a honeycomb shape defined by the first and second apertures; and solidifying the solid-state electrolyte precursor to form a uniformly distributed solid-state electrolyte. During such in situ solidification, for example, sulfide may be deposited onto the electroactive materials (for example, the electroactive material particles may act as crystal nuclei) so as to create intimate contacts that will help facilitate ion transfer. The skilled artisan will recognized that in certain instances the electrolyte precursor may be added to the respective electrodes and other battery components and solidified prior to assembly (e.g., stacking).

FIGS. 2A-2F is an illustration of an example method 200 for forming an solid-state electrochemical battery cell 292 having a substantially uniform distribution of a solid-state electrolyte 294. The method 200 may include preparing or assembling two or more electrodes 212, 222. As illustrated, a positive electrode 212 may be prepared at step 210. A negative electrode 222 may be prepared at step 220. Steps 210 and 220 may occur concurrently or subsequently.

Like positive electrode 24 illustrated in FIG. 1, the positive electrode 212 may include a plurality of positive solid-state electroactive particles 214 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a positive current collector 216. In one example, the plurality of positive solid-state electroactive particles 214 may include, for example only, $LiNi_{0.5}Mn_{1.5}O_4$.

Method step 210 may include disposing the plurality of positive solid-state electroactive particles 214 on the positive current collector 216. The plurality of positive solid-state electroactive particles 214 may be disposed onto the positive current collector 216 using known processes, such as wet-coating processes.

The plurality of positive solid-state electroactive particles 214 defines a positive electrode layer 218. The positive electrode layer 218 may have a first porosity. The first porosity may be, for example, greater than or equal to about 10 vol. % to less than or equal to about 50 vol. %, and in certain aspects, optionally greater than or equal to about 20 vol. % to less than or equal to about 30 vol. %. The positive electrode layer 218 may have a thickness greater than or equal to about 1 greater than or equal to about 1 µm to less than or equal to about 1000 µm, and in certain aspects, optionally greater than or equal to about 10 µm to less than or equal to about 500 µm.

Similarly, like negative electrode 22 illustrated in FIG. 1, the negative electrode 222 may include a plurality of negative solid-state electroactive particles 224 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a negative current collector 226. In one example, the plurality of negative solid-state electroactive particles 224 may include, for example only, $Li_4Ti_5O_{12}$. Method step 220 may include disposing the plurality of negative solid-state electroactive particles 224 on the negative current collector 226. The plurality of negative solid-state electroactive particles 224 may be disposed onto the negative current collector 226 using known processes, such as wet-coating processes.

The plurality of negative solid-state electroactive particles 224 defines a negative electrode layer 228. The negative electrode layer 228 may have a first porosity. The first porosity may be, for example, greater than or equal to about 1 vol. % to less than or equal to about 50 vol. %, and in certain aspects, optionally greater than or equal to about 20 vol. % to less than or equal to about 30 vol. %. The negative electrode layer may have a thickness greater than or equal to about 1 greater than or equal to about 1 µm to less than or equal to about 1000 µm, and in certain aspects, optionally greater than or equal to about 10 µm to less than or equal to about 500 µm.

Figure 4:
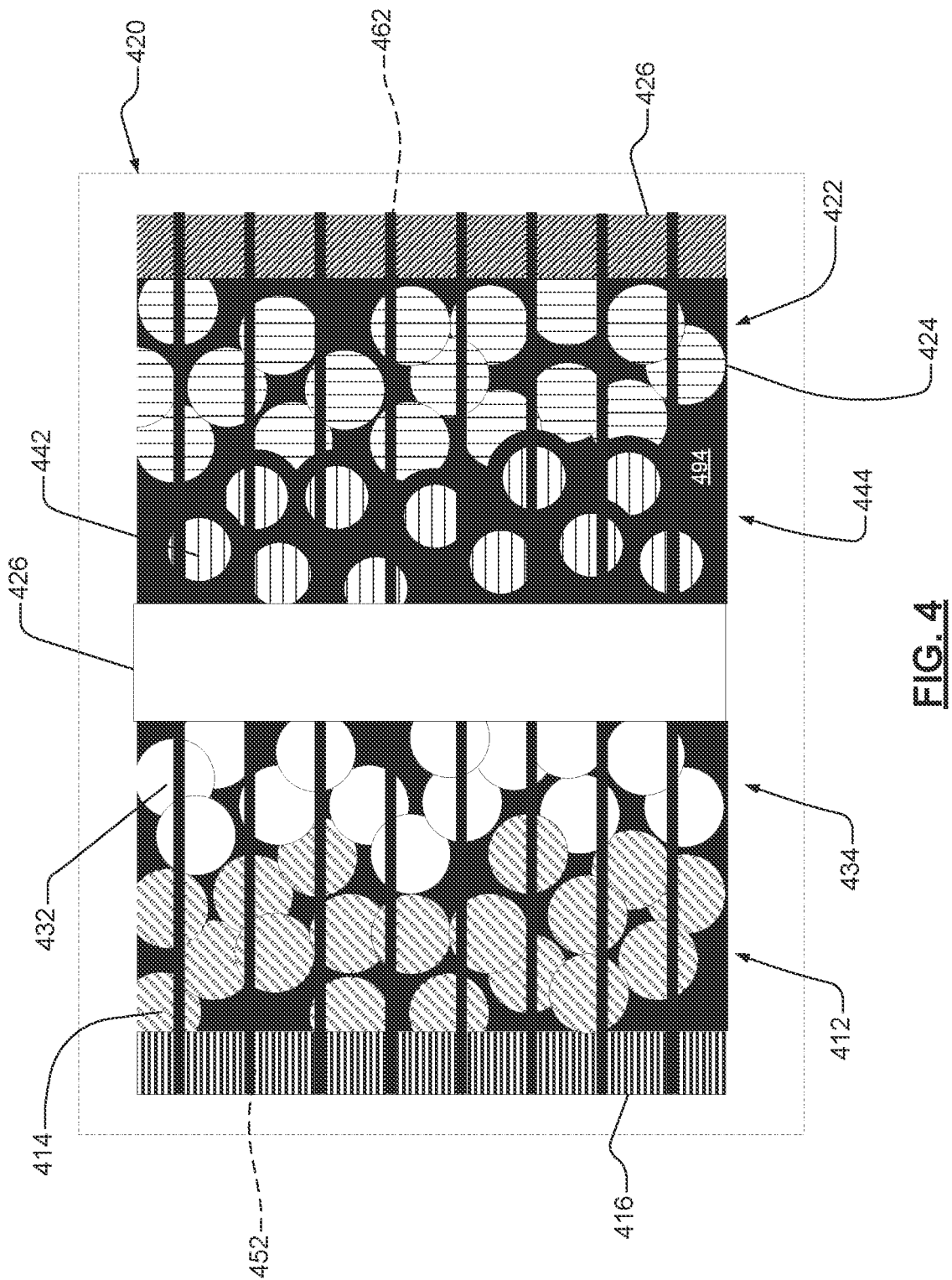
FIG. 4 is a schematic of an example solid-state electrochemical battery cell having a substantially uniform distribution of a solid-state electrolyte and including one or more solid-state electrolyte layers and separator in accordance with various aspects of the present disclosure.
Figure 5:
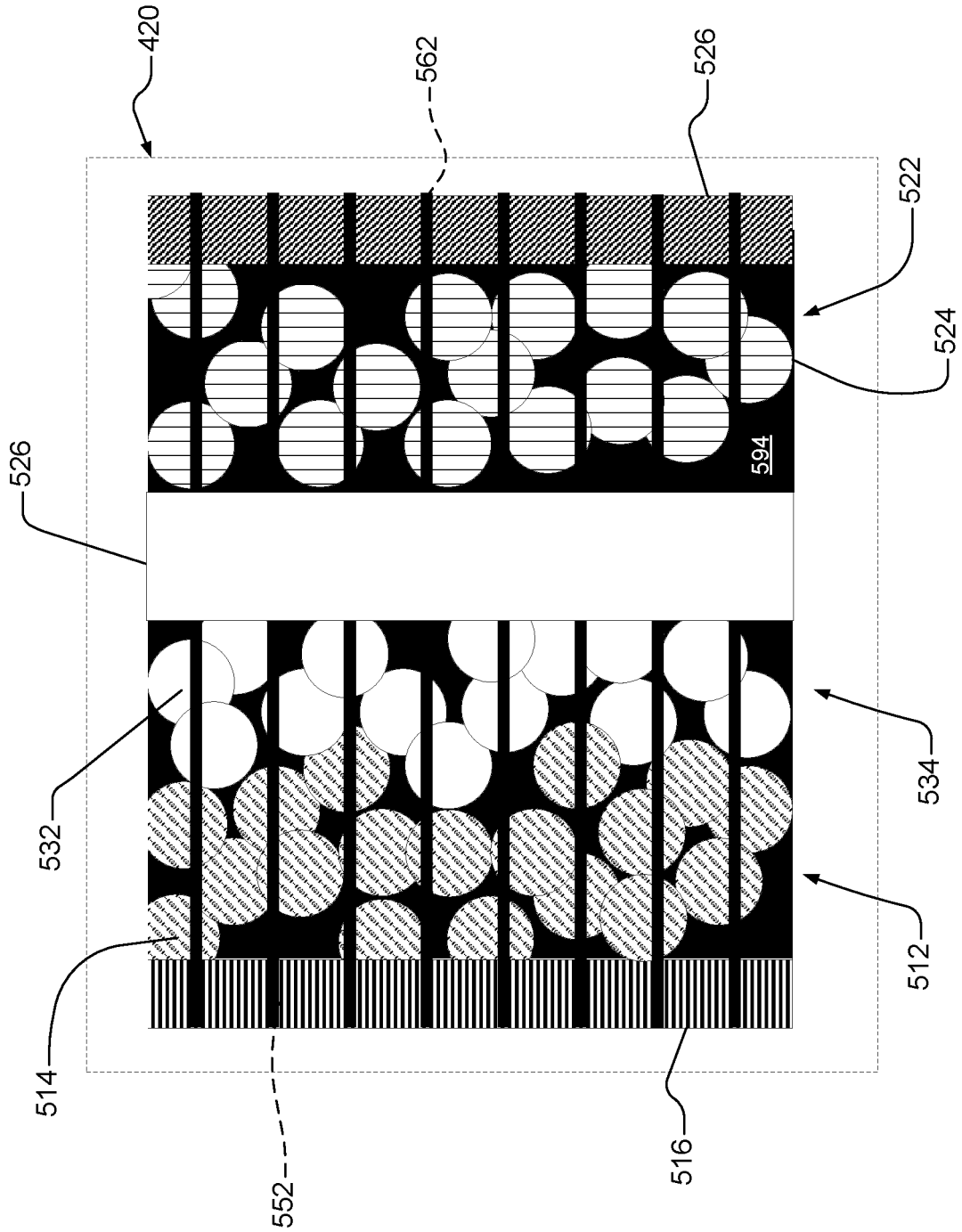
FIG. 5 is a schematic of another example solid-state electrochemical battery cell having a substantially uniform distribution of a solid-state electrolyte and including one or more solid-state electrolyte layers and separator in accordance with various aspects of the present disclosure.
Figure 6:
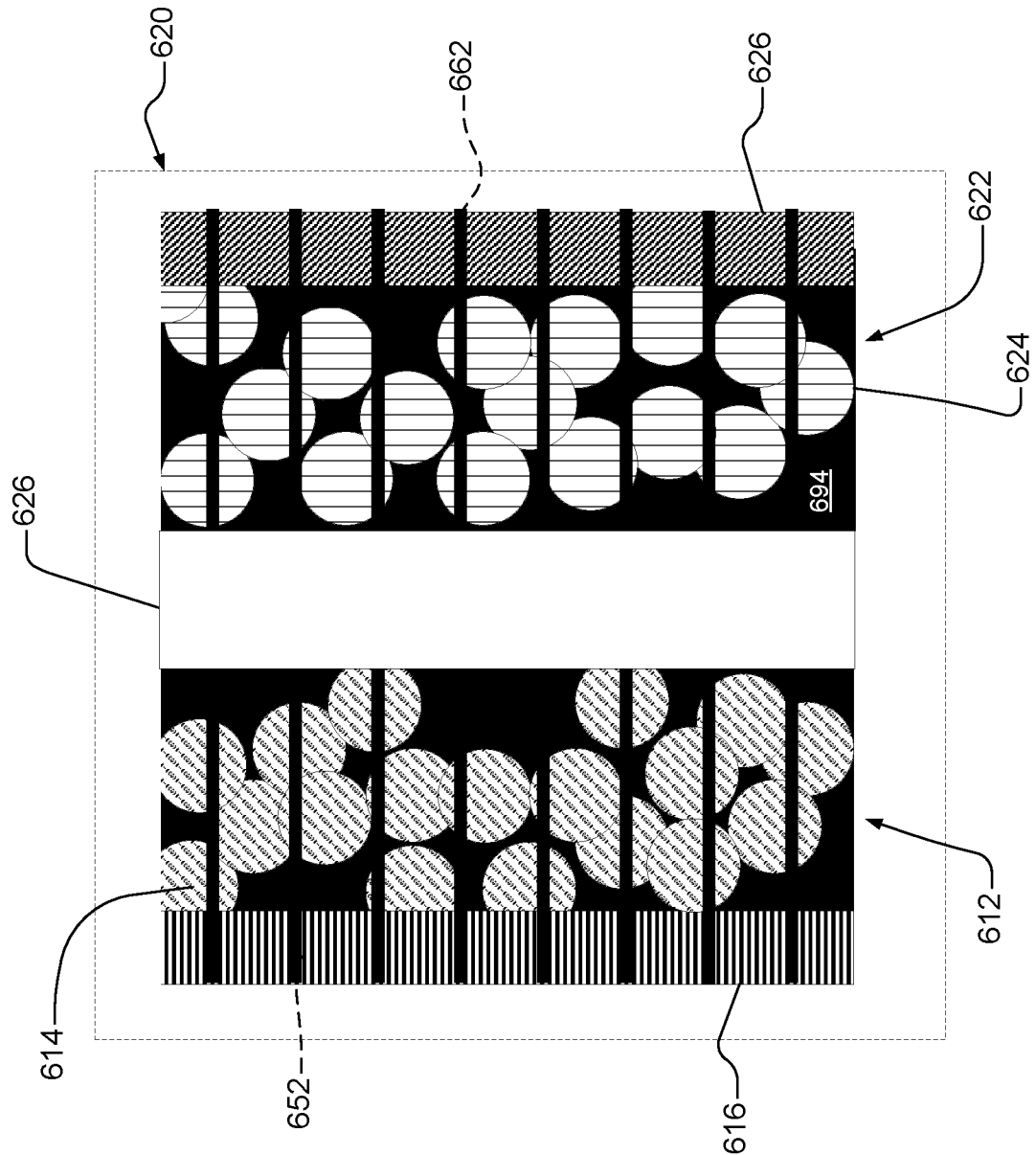
FIG. 6 is a schematic of an example solid-state electrochemical battery cell having a substantially uniform distribution of a solid-state electrolyte and including a separator in accordance with various aspects of the present disclosure.

With renewed reference to FIGS. 2A-2F, the method 200 may further include, as illustrated at step 230, disposing a first plurality of solid-state electrolyte particles 232 on an exposed surface of the positive electrode layer 218, and/or at step 240, disposing a second plurality of solid-state electrolyte particles 242 on an exposed surface of the negative electrolyte layer 228. As in the instance of steps 210 and 220 discussed above, steps 230 and 240 may be concurrent or consecutive steps. For example, in certain variations, step 230 will follow step 210, step 220 will then follow step 220, and step 240 will follow step 220. In other variations, however, steps 210 and 220 may occur concurrently and subsequent steps 230 and 240 may occur concurrently. Further, the skill artisan will appreciate that the present teachings also apply in instances where solid-state electrolyte particles are disposed on only one of the positive electrode layer 218 or the negative electrode layer 228, as well as instances where the electrochemical battery cell includes a traditional separator in addition to, or instead of, a first solid-state electrolyte layer 234 and/or a second solid-state electrolyte layer 244, such as illustrated in FIGS. 4-6.

In each variation, the first plurality of solid-state electrolyte particles 232 and/or the second plurality of solid-state electrolyte particles 242 may be the same or different. Like solid-state electrolyte particles 30 illustrated in FIG. 1, the first plurality of solid-state electrolyte particles 232 and the second plurality of solid-state electrolyte particles 242 may comprise one or more solid-state electrolyte materials that are high-temperature (e.g., >150° C.) stable. For example, the first plurality of solid-state electrolyte particles 232 and the second plurality of solid-state electrolyte particles 242 may comprise one or more: oxide-based particles ("O-SSE"), metal-doped or aliovalent-substituted oxide particles, nitride-based particles, hydride-based particles, halide-based particles, borate-based particles, and/or phosphate-based particles, as well as other air-stable particles (such as, for example only, $Li_{3.88}Sn_{0.833}As_{0.166}S_4$, LiI—$Li_4SnS_4$, and/or $Li_4SnS_4$) and/or other oxide ceramic powders (such as $SiO_2$, $CeO_2$, $Al_2O_3$, $ZrO_2$). In one example, the first plurality of solid-state electrolyte particles 232 and/or the second plurality of solid-state electrolyte particles 242 may include, for example only, $Li_{1.4}Al_{0.4}Ti_{1.6}(PO_4)_3$ (LATP).

The first plurality of solid-state electrolyte particles 232 may define a first solid-state electrolyte layer 234. The first solid-state electrolyte layer 234 may have a first porosity. The first porosity may be, for example, greater than or equal to about 1 vol. % to less than or equal to about 50 vol. %, and in certain aspects, optionally greater than or equal to about 20 vol. % to less than or equal to about 30 vol. %. The first solid-state electrolyte layer 234 may have a thickness greater than or equal to about 1 µm to less than or equal to about 500 µm. Likewise, the second plurality of solid-state electrolyte particles 242 may define a second solid-state electrolyte layer 244. The second solid-state electrolyte layer 244 may have a first porosity. The first porosity may be, for example, greater than or equal to about 1 vol. % to less than or equal to about 50 vol. %, and in certain aspects, optionally greater than or equal to about 20 vol. % to less than or equal to about 30 vol. %. The second solid-state electrolyte layer 244 may have a thickness greater than or equal to about 1 µm to less than or equal to about 500 µm.

Figure 3:
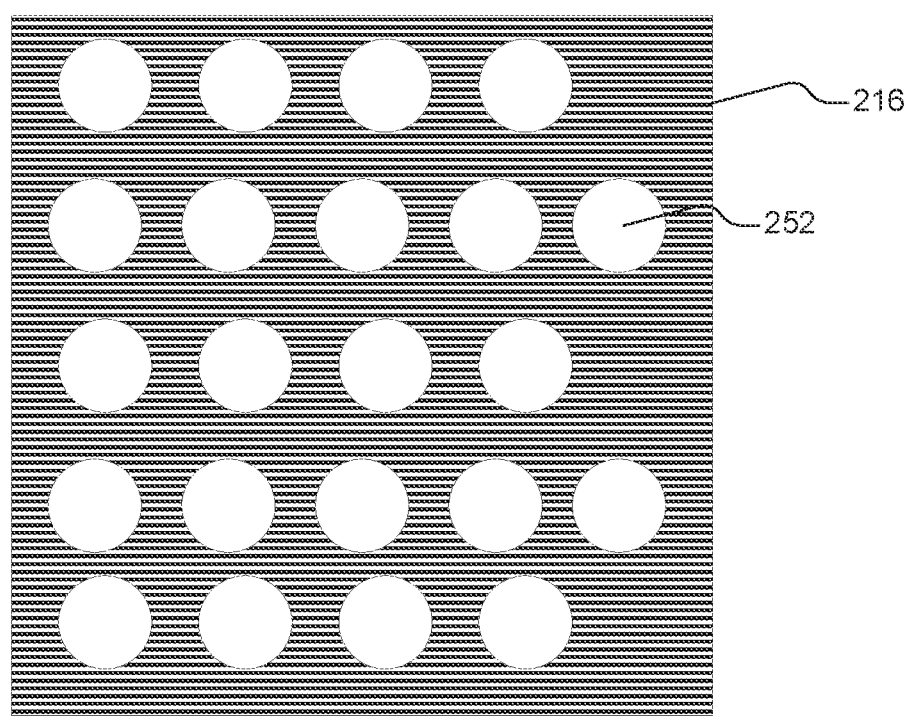
FIG. 3 is a schematic cross-sectional view of an example current collector having a plurality of apertures formed therein in accordance with various aspects of the present disclosure.

With renewed reference to FIGS. 2A-2F, the method 200 further includes, as illustrated at step 250, creating a first plurality of apertures 252 in the positive electrode 212 and first solid-state electrolyte layer 234. Similarly, the method 200 includes at step 260, creating a second plurality of apertures 262 in the negative electrode 222 and second solid-electrolyte layer 244. By way of non-limiting example, a schematic cross-sectional view of the positive current collector 216 having a first plurality of apertures 252 illustrated in FIG. 3. In each instance, the apertures 252, 262 may be punched into the respective layers 212, 222, 234, 244. The apertures 252, 262 may be formed using known mechanical needling processes, or other physical processes. The apertures 252, 262 may be form prior to stacking, as illustrated, so as to limit displacement of the solid-state electroactive particles and/or solid-state electrolyte particles during punching.

As illustrated, the apertures 252, 262 may be continuous forming, for example only, a plurality of channel through the respective layers, including the first solid-state electrolyte layer 234 and the positive electrode 212 (including the positive electrode layer 218 and the positive current collector 216) and the second solid-state electrolyte layer 244 and the negative electrode 222 (including the negative electrode layer 228 and the negative current collector 226). The apertures 252, 262 may have an average diameter greater than or equal to about 50 nm to less than or equal to about 5000 µm, and in certain aspects, optionally greater than or equal to about 1000 nm to less than or equal to about 100 µm.

After punching, the positive electrode 212 and the first solid-state electrolyte layer 234 may each have a second porosity. The second porosity is greater than the first porosity. For example, the second porosity may be greater than or equal to about 10 vol. % to less than or equal to about 50 vol. %, and in certain aspects, optionally greater than or equal to about 30 vol. % to less than or equal to about 40 vol. %. Likewise, the negative electrode 222 and the second solid-state electrolyte layer 244 may each have a second porosity. The second porosity is greater than the first porosity. For example, the second porosity may be greater than or equal to about 1 vol. % to less than or equal to about 50 vol. %, and in certain aspects, optionally greater than or equal to about 30 vol. % to less than or equal to about 40 vol. %.

With renewed reference to FIGS. 2A-2F, the method 200 may further include, as illustrated at step 270, stacking the positive electrode 212 and the negative electrode 222, including first and second solid-state electrolyte layers 232, 242, to form an example cell core 272. Although the illustrated example include a single solid-state positive electrode and a single solid-state negative electrode, the skilled artisan will recognize that the current teaching extend to various other configurations, including those having one or more solid-state cathodes and one or more solid-state anodes, as well as various current collectors with solid-state electroactive layers disposed on or adjacent to one or more surfaces thereof. Likewise, though not illustrated in FIG. 2A-2F the skilled artisan will recognized that in various other configurations a traditional polymer-based separator (e.g., polyimide (PI) fibers nonwovens) may be disposed between each of the first and second solid-state electrolyte layers 232, 242, disposed between the positive and negative electrodes 212, 222, and/or between one of the first and second solid-state electrolyte layers 232, 242 and/or one of the positive and negative electrodes 212, 222, such as illustrated in FIGS. 4-6.

The method further includes, as illustrated at step 280, loading or impregnating the stack 272 with a solid-state electrolyte precursor 284. The solid-state electrolyte precursor 284 is a solution, for example a substantially homogeneous solution, that is able to wet interparticle voids between the solid-state electroactive particles 214, 224 and/or the solid-state electrolyte particles 232, 242 and to and infiltrate the apertures 252, 262, as well as any other voids, holes, or pores within the stack 272. The solid-state electrolyte precursor 284 comprises a third plurality of solid-state electrolyte particles (not shown) and a solvent, such as ethanol, tetrahydrofuran, ethylacetate, acetonitrile, water, N-methyl formamide, 1,2-dimethoxyethane, and/or methanol. The solid-state electrolyte precursor 284 may include greater than or equal to about 1 wt. % to less than or equal to about 60 wt. % of the third plurality of solid-state electrolyte particles, and greater than or equal to about 1 wt. % to less than or equal to about 20 wt. % of the solvent. As illustrated, the solid-state electrolyte precursor 284 may fill (e.g., flow into) substantially all voids within the cell precursor 272. The solid-state electrolyte precursor 284 may be introduced using an inject process and/or dip process, by way of non-limiting example.

The third plurality of solid-state electrolyte particles may be the same or different from the first plurality of solid-state electrolyte particles 232 and/or the second plurality of solid-state electrolyte particles 242. The third plurality of solid-state electrolyte particles may be sulfide-based solid-state electrolyte particles, for example, because sulfide-based solid-state electrolyte particles readily forms the precursor solution. The sulfide-based solid-state electrolyte particles may be pseudobinary (such as, $Li_3PS_4$, $Li_7P_3S_{11}$, $Li_4SnS_4$, $80Li_2S.20P_2S_5$, and the like), pseudotemary (such as, $Li_{3.25}Ge_{0.25}P_{0.75}S_4$, $Li_6PS_5Br$, $Li_6PS_5Cl$, $Li_7P_2S_8I$, $Li_4PS_4I$, LiI—$Li_4SnS_4$, and the like), and/or pseudoquaternary (such as, $Li_{9.54}Si_{1.74}P_{1.44}S_{11.7}C_{0.3}$, $Li_{10.35}[Sn_{0.27}Si_{1.08}]P_{1.65}S_{12}$, and the like). In other variations, the third plurality of solid-state electrolyte particles may be halide-based solid-state electrolyte particles. The halide-based solid-state electrolyte particles may be, for example, LiI, $Li_2CdCl_4$, $Li_2MgCl_4$, $Li_2CdI_4$, $Li_2ZnI_4$, $Li_3OCl$, and the like. In still other variations, the third plurality of solid-state electrolyte particles may be polymer-based solid-state electrolyte particles. The polymer-based solid-state electrolyte particles may be, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), and the like. In certain instances, the solid-state electrolyte comprising the third plurality of solid-state electrolyte particles may be a gel having a low viscosity (e.g., about 20 mPa·s). In one example, the solid-state electrolyte precursor 284 may include $Li_6PS_5Cl$, by way of non-limiting example.

The method further includes, as illustrated at step 290, solidifying the solid-state electrolyte precursor 284 (in situ) to form an solid-state battery 292 including a solid-state electrolyte 294 (including the solid-state electrolyte particles) having substantially uniformed distribution within the honeycomb stack structure. The solid-state electrolyte precursor solution 284 may be solidified by heating the precursor solution 284 so as to evaporate the solvent. The precursor 284 may be heated to a temperature greater than or equal to about 50° C. to less than or equal to about 300° C., and in certain aspects, optionally about 180° C. for a time greater than or equal to about 30 minutes to less than or equal to about 24 hours.

FIG. 4 is a schematic of an example solid-state electrochemical battery 420 prepared in accordance with various aspects of the present disclosure. In various aspects, the solid-state electrochemical battery 420 may be prepared using method 200 as illustrated in FIGS. 2A-2F. Similar to solid-state electrochemical battery 292 (and also solid-state electrochemical battery 20), solid-state electrochemical battery 420 includes a solid-state negative electrode 422 (e.g., anode) and a solid-state positive electrode 412 (e.g., cathode). One or more solid-state electrolyte layers 434, 444 and/or a separator 426 may be disposed between the two electrodes 412, 422. For example, as illustrated, a first solid-state electrolyte layer 434 may be disposed near or adjacent to the positive electrode 412 and a second solid-state electrolyte layer 444 may be disposed near or adjacent to the negative electrode 422. The separator 426 may be disposed between the first solid-state electrolyte layer 434 and the second solid-state electrolyte layer 444.

The solid-state positive electrode 412 may include a plurality of positive solid-state electroactive particles 414 (and in certain aspects, though not illustrated, a certain or predetermined amount (e.g., greater than or equal to about 0 wt. % to less than or equal to about 20 wt. %) disposed adjacent to a first surface of a positive current collector 416. The solid-state negative electrode 422 may include a plurality of solid-state electroactive particles 424 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a negative current collector 426.

The first solid-state electrolyte layer 434 may include a first plurality of solid-state electroactive particles 432. The second solid-state electrolyte layer 444 may include a second plurality of solid-state electroactive particles 442. The first plurality of solid-state electrolyte particles 432 and/or the second plurality of solid-state electrolyte particles 442 may be the same or different. Like solid-state electrolyte particles 30 illustrated in FIG. 1 (and also, the first and second pluralities of solid-state electroactive particles 232, 242 illustrated in FIGS. 2B-2F), the first plurality of solid-state electrolyte particles 232 and the second plurality of solid-state electrolyte particles 242 may comprise one or more solid-state electrolyte materials that are high-temperature (e.g., >150° C.) stable.

For example, the first plurality of solid-state electrolyte particles 432 and the second plurality of solid-state electrolyte particles 442 may comprise one or more: oxide-based particles ("O-SSE"), metal-doped or aliovalent-substituted oxide particles, nitride-based particles, hydride-based particles, halide-based particles, borate-based particles, and/or phosphate-based particles, as well as other air-stable particles (such as, for example only, $Li_{3.88}Sn_{0.833}As_{0.166}S_4$, $LiI$—$Li_4SnS_4$, and/or $Li_4SnS_4$) and/or other oxide ceramic powders (such as $SiO_2$, $CeO_2$, $Al_2O_3$, $ZrO_2$). In one example, the first plurality of solid-state electrolyte particles 232 and/or the second plurality of solid-state electrolyte particles 242 may include, for example only, $Li_{1.4}Al_{0.4}Ti_{1.6}(PO_4)_3$ (LATP).

The separator 426 is a high-temperature stable separator that may be selected from polymer-based films, solid-state electrolyte enabled films or plates, and/or oxide ceramic powder-enabled films or plates. For example, the separator 426 may be a microporous polymeric separator. In certain instances, a single layer of the polyolefin may form the entire separator 426. In other aspects, the separator 426 may be a fibrous membrane having an abundance of pores extending between the opposing surfaces. As another example, however, multiple discrete layers of similar or dissimilar polyolefins may be assembled to form the microporous polymer separator 426. The separator 426 may also comprise other polymers in addition to, or in place of, the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure.

The polyolefin layer, and any other optional polymer layers, may further be included in the separator 426 as a fibrous layer to help provide the separator 426 with appropriate structural and porosity characteristics. In certain aspects, the separator 426 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 426 are contemplated, as well as the many manufacturing methods that may be employed to produce such a microporous polymer separator 426.

In certain variations, the separator 426 may be a polyimide (PI) nanofiber-based nonwoven separator, a nano-sized $Al_2O_3$ and poly(lithium 4-styrenesulfonate)-coated polyethylene membrane senator, $SiO_2$ coated polyethylene (PE) separator, a co-polyimide-coated polyethylene separator, polyetherimide (PEI) (bisphenol-aceton diphthalic anhydride (BPADA) and para-phenylenediamine) separator, expanded polytetrafluoroethylene reinforced polyvinylidenefluoride-hexafluoropropylene separator, and/or sandwich-structure PVdF/PMIA/PVdF nanofibrous separator. In other variations, the separator 426 may include, for example, a $Li_7La_3Zr_2O_{12}$ film and/or a $Li_{1+x}Al_xGe_{2-x}(PO_4)_3$ film. In still other variations, the separator 426 may include, for example, an $Al_2O_3$ film and/or a $ZrO_2$ film. In each instance, the separator 426 may have a thickness greater than or equal to about 1 μm to less than or equal to about 100 μm, and in certain instances, optionally greater than or equal to about 2 μm to less than or equal to about 50 μm. The separator 426 may have a porosity greater than or equal to about 0.1 vol. % to less than or equal to about 80 vol. %, and in certain aspects, optionally greater than or equal to about 10 vol. % to less than or equal to about 70 vol. %.

As illustrated, a first plurality of apertures 452 were punched into the positive electrode 412, as well as the first solid-state electrolyte layer 434. A second plurality of apertures 462 were punched in the negative electrode 422, as well as the second solid-electrolyte layer 444. A solid-state electrolyte 494 is distributed within the first plurality of apertures 452 and the second plurality of apertures 462, as well as other voids, holes, and/or pores within the battery 420, including within the separator 426. The solid-state electrolyte 494 may be prepared using a method such as described in FIGS. 2A-2F. The solid-state electrolyte 494 may include one or more solid-state sulfide electrolytes (such as, $Li_3PS_4$, $Li_7P_3S_{11}$, $Li_4SnS_4$, $80Li_2S.20P_2S_5$, $Li_{3.25}Ge_{0.25}P_{0.75}S_4$, $Li_6PS_5Br$, $Li_6PS_5Cl$, $Li_7P_2S_8I$, $Li_4PS_4I$, $LiI$—$Li_4SnS_4$, $Li_{9.54}Si_{1.74}P_{1.44}S_{11.7}Cl_{0.3}$, $Li_{10.35}[Sn_{0.27}Si_{1.08}]P_{1.65}S_{12}$, and the like), one or more halide-based solid-state electrolytes (such as, $LiI$, $Li_2CdCl_4$, $Li_2MgCl_4$, $Li_2CdI_4$, $Li_2ZnI_4$, $Li_3OCl$, and the like), one or more polymer-based solid-state electrolytes (such as, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), and the like), and combinations thereof.

FIG. 5 is a schematic of another example solid-state electrochemical battery 520 prepared in accordance with various aspects of the present disclosure. In various aspects, the solid-state electrochemical battery 520 may be prepared using method 200 as illustrated in FIGS. 2A-2F. Similar to solid-state electrochemical battery 292 (and also solid-state electrochemical battery 20 and solid-state electrochemical battery 420), solid-state electrochemical battery 520 includes a solid-state negative electrode 522 (e.g., anode) and a solid-state positive electrode 512 (e.g., cathode). One or more solid-state electrolyte layers 534, 544 and/or a separator 526 may be disposed between the two electrodes 512, 522. For example, as illustrated, a solid-state electrolyte layer 534 may be disposed near or adjacent to the positive electrode 512. The separator 526 may be disposed between the solid-state electrolyte layer 534 and the negative electrode 522. Though not illustrated, the skilled artisan will appreciated that in other variations a solid-state electrolyte layer may be disposed near to adjacent to a negative electrode and a separator may be disposed between the solid-state electrolyte layer and the positive electrode.

The solid-state positive electrode 512 may include a plurality of positive solid-state electroactive particles 514 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a positive current collector 516. The solid-state negative electrode 522 may include a plurality of solid-state electroactive particles 524 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a negative current collector 526.

The solid-state electrolyte layer 534 may include a first plurality of solid-state electroactive particles 532. Like solid-state electrolyte particles 30 illustrated in FIG. 1 (and also, the first and second pluralities of solid-state electroactive particles 232, 242 illustrated in FIGS. 2B-2F), the solid-state electrolyte particles 532 may comprise one or more solid-state electrolyte materials that are high-temperature (e.g., >150° C.) stable. For example, the plurality of solid-state electrolyte particles 432 and may comprise one or more: oxide-based particles ("O-SSE"), metal-doped or aliovalent-substituted oxide particles, nitride-based particles, hydride-based particles, halide-based particles, borate-based particles, and/or phosphate-based particles, as well as other dry air-stated particles (such as, for example only, $Li_{3.88}Sn_{0.833}As_{0.166}S_4$, $LiI$—$Li_4SnS_4$, and/or $Li_4SnS_4$) and/or other oxide ceramic powders (such as $SiO_2$, $CeO_2$, $Al_2O_3$, $ZrO_2$). In one example, the solid-state electrolyte particles 232 include, for example only, $Li_{1.4}Al_{0.4}Ti_{1.6}(PO_4)_3$ (LATP).

The separator 526 is a high-temperature separator that may be selected from polymer-based films, solid-state electrolyte enabled films or plates, and/or oxide ceramic powder-enabled films or plates. For example, the separator 526 may be a microporous polymeric separator. In certain instances, a single layer of the polyolefin may form the entire separator 526. In other aspects, the separator 526 may be a fibrous membrane having an abundance of pores extending between the opposing surfaces. As another example, however, multiple discrete layers of similar or dissimilar polyolefins may be assembled to form the microporous polymer separator 526. The separator 526 may also comprise other polymers in addition to, or in place of, the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure.

The polyolefin layer, and any other optional polymer layers, may further be included in the separator 526 as a fibrous layer to help provide the separator 526 with appropriate structural and porosity characteristics. In certain aspects, the separator 526 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 526 are contemplated, as well as the many manufacturing methods that may be employed to produce such a microporous polymer separator 526.

In certain variations, the separator 526 may be a polyimide (PI) nanofiber-based nonwoven separator, a nano-sized $Al_2O_3$ and poly(lithium 4-styrenesulfonate)-coated polyethylene membrane senator, $SiO_2$ coated polyethylene (PE) separator, a co-polyimide-coated polyethylene separator, polyetherimide (PEI) (bisphenol-aceton diphthalic anhydride (BPADA) and para-phenylenediamine) separator, expanded polytetrafluoroethylene reinforced polyvinylidenefluoride-hexafluoropropylene separator, and/or sandwich-structure PVdF/PMIA/PVdF nanofibrous separator. In other variations, the separator 526 may include, for example, a $Li_7La_3Zr_2O_{12}$ film and/or a $Li_{1+x}Al_xGe_{2-x}(PO_4)_3$ film. In still other variations, the separator 526 may include, for example, an $Al_2O_3$ film and/or a $ZrO_2$ film. In each instance, the separator 526 may have a thickness greater than or equal to about 1 µm to less than or equal to about 100 µm, and in certain instances, optionally greater than or equal to about 2 µm to less than or equal to about 50 µm. The separator 526 may have a porosity greater than or equal to about 0.1 vol. % to less than or equal to about 80 vol. %, and in certain aspects, optionally greater than or equal to about 10 vol. % to less than or equal to about 70 vol. %.

As illustrated, a first plurality of apertures 552 were punched into the positive electrode 512, as well as the first solid-state electrolyte layer 434. A second plurality of apertures 562 were punched in the negative electrode 522. A solid-state electrolyte 594 is distributed within the first plurality of apertures 552 and the second plurality of apertures 562, as well as other voids, holes, and/or pores within the battery 520, including within the separator 526. The solid-state electrolyte 594 may be prepared using a method such as described in FIGS. 2A-2F. The solid-state electrolyte 594 may include one or more solid-state sulfide electrolytes (such as, $Li_3PS_4$, $Li_7P_3S_{11}$, $Li_4SnS_4$, $80Li_2S.20P_2S_5$, $Li_{3.25}Ge_{0.25}P_{0.75}S_4$, $Li_6PS_5Br$, $Li_6PS_5Cl$, $Li_7P_2S_8I$, $Li_4PS_4I$, $LiI$—$Li_4SnS_4$, $Li_{9.54}Si_{1.74}P_{1.44}S_{11.7}Cl_{0.3}$, $Li_{10.35}[Sn_{0.27}Si_{1.08}]P_{1.65}S_{12}$, and the like), one or more halide-based solid-state electrolytes (such as, LiI, $Li_2CdCl_4$, $Li_2MgCl_4$, $Li_2CdI_4$, $Li_2ZnI_4$, $Li_3OCl$, and the like), one or more polymer-based solid-state electrolytes (such as, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), and the like), and combinations thereof.

FIG. 6 is a schematic of another example solid-state electrochemical battery 620 prepared in accordance with various aspects of the present disclosure. In various aspects, the solid-state electrochemical battery 620 may be prepared using method 200 as illustrated in FIGS. 2A-2F. Similar to solid-state electrochemical battery 292 (and also solid-state electrochemical battery 20 and solid-state electrochemical battery 420 and solid-state electrochemical battery 520), solid-state electrochemical battery 620 includes a solid-state negative electrode 622 (e.g., anode), a solid-state positive electrode 612 (e.g., cathode), and a separator 626 disposed between the two electrodes 612, 622.

The solid-state positive electrode 612 may include a plurality of positive solid-state electroactive particles 614 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a positive current collector 616. The solid-state negative electrode 622 may include a plurality of solid-state electroactive particles 624 (and in certain aspects, though not illustrated, a certain or predetermined amount (e.g., greater than or equal to about 0 wt. % to less than or equal to about 20 wt. %) of electrode additives and/or solid-state electrolyte particles) disposed adjacent to a first surface of a negative current collector 626.

The separator 626 is a high-temperature separator that may be selected from polymer-based films, solid-state electrolyte enabled films or plates, and/or oxide ceramic powder-enabled films or plates. For example, the separator 626 may be a microporous polymeric separator. In certain instances, a single layer of the polyolefin may form the entire separator 626. In other aspects, the separator 626 may be a fibrous membrane having an abundance of pores extending between the opposing surfaces. As another example, however, multiple discrete layers of similar or dissimilar polyolefins may be assembled to form the microporous polymer separator 626. The separator 626 may also comprise other polymers in addition to, or in place of, the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure.

The polyolefin layer, and any other optional polymer layers, may further be included in the separator 626 as a fibrous layer to help provide the separator 626 with appropriate structural and porosity characteristics. In certain aspects, the separator 626 may also be mixed with a ceramic material or its surface may be coated in a ceramic material. For example, a ceramic coating may include alumina ($Al_2O_3$), silicon dioxide ($SiO_2$), titania ($TiO_2$) or combinations thereof. Various conventionally available polymers and commercial products for forming the separator 626 are contemplated, as well as the many manufacturing methods that may be employed to produce such a microporous polymer separator 626.

In certain variations, the separator 626 may be a polyimide (PI) nanofiber-based nonwoven separator, a nano-sized $Al_2O_3$ and poly(lithium 4-styrenesulfonate)-coated polyethylene membrane senator, $SiO_2$ coated polyethylene (PE) separator, a co-polyimide-coated polyethylene separator, polyetherimide (PEI) (bisphenol-aceton diphthalic anhydride (BPADA) and para-phenylenediamine) separator, expanded polytetrafluoroethylene reinforced polyvinylidenefluoride-hexafluoropropylene separator, and/or sandwich-structure PVdF/PMIA/PVdF nanofibrous separator. In other variations, the separator 626 may include, for example, a $Li_7La_3Zr_2O_{12}$ film and/or a $Li_{1+x}Al_xGe_{2-x}(PO_4)_3$ film. In still other variations, the separator 626 may include, for example, an $Al_2O_3$ film and/or a $ZrO_2$ film. In each instance, the separator 626 may have a thickness greater than or equal to about 1 μm to less than or equal to about 100 μm, and in certain instances, optionally greater than or equal to about 2 μm to less than or equal to about 50 μm. The separator 626 may have a porosity greater than or equal to about 0.1 vol. % to less than or equal to about 80 vol. %, and in certain aspects, optionally greater than or equal to about 10 vol. % to less than or equal to about 70 vol. %.

As illustrated, a first plurality of apertures 652 were punched into the positive electrode 612, and a second plurality of apertures 662 were punched in the negative electrode 622. A solid-state electrolyte 694 is distributed within the first plurality of apertures 652 and the second plurality of apertures 662, as well as other voids, holes, and/or pores within the battery 620, including within the separator 626. The solid-state electrolyte 694 may be prepared using a method such as described in FIGS. 2A-2F. The solid-state electrolyte 694 may include one or more solid-state sulfide electrolytes (such as, $Li_3PS_4$, $Li_7P_3S_{11}$, $Li_4SnS_4$, $80Li_2S\cdot20P_2S_5$, $Li_{3.25}Ge_{0.25}P_{0.75}S_4$, $Li_6PS_5Br$, $Li_6PS_5Cl$, $Li_7P_2S_8I$, $Li_4PS_4I$, $LiI—Li_4SnS_4$, $Li_{9.54}Si_{1.74}P_{1.44}S_{11.7}Cl_{0.3}$, $Li_{10.35}[Sn_{0.27}Si_{1.08}]P_{1.65}S_{12}$, and the like), one or more halide-based solid-state electrolytes (such as, LiI, $Li_2CdCl_4$, $Li_2MgCl_4$, $Li_2CdI_4$, $Li_2ZnI_4$, $Li_3OCl$, and the like), one or more polymer-based solid-state electrolytes (such as, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), and the like), and combinations thereof.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for preparing a solid-state electrochemical cell having one or more solid-state electrodes and a distributed solid-state electrolyte, the method comprising:
   preparing the one or more solid-state electrodes by disposing a solid-state electroactive material layer adjacent to a current collector, the solid-state electroactive material layer comprising a plurality solid-state electroactive particles;
   punching a plurality of apertures into the one or more solid-state electrodes, the plurality of apertures extending continuously through the solid-state electroactive material layer and the current collector;
   impregnating the one or more solid-state electrodes with a solid-state electrolyte precursor solution so as to fill the plurality of apertures and any other void or pores within the one or more electrodes with the solid-state electrolyte precursor solution; and
   heating the one or more electrodes so as to solidify the solid-state electrolyte precursor solution and to form the distributed solid-state electrolyte.

2. The method of claim 1, wherein the solid-state electrolyte precursor solution comprises one or more solid-state electrolyte materials homogeneously distributed in solution, wherein the one or more solid-state electrolyte materials comprise one or more sulfide solid-state electrolytes, halide-based solid-state electrolytes, polymer-based solid-state electrolytes, and combinations thereof.

3. The method of claim 2, wherein the one or more sulfide solid-state electrolyte is selected from the group consisting of: $Li_3PS_4$, $Li_7P_3S_{11}$, $Li_4SnS_4$, $80Li_2S\cdot20P_2S_5$, $Li_{3.25}Ge_{0.25}P_{0.75}S_4$, $Li_6PS_5Br$, $Li_6PS_5Cl$, $Li_7P_2S_8I$, $Li_4PS_4I$, $LiI—Li_4SnS_4$, $Li_{9.54}Si_{1.74}P_{1.44}S_{11.7}Cl_{0.3}$, $Li_{10.35}[Sn_{0.27}Si_{1.08}]P_{1.65}S_{12}$, and combinations thereof,
   wherein the one or more halide-based solid-state electrolytes is selected from the group consisting of LiI, $Li_2CdCl_4$, $Li_2MgCl_4$, $Li_2CdI_4$, $Li_2ZnI_4$, $Li_3OCl$, and combinations thereof, and
   wherein the one or more polymer-based solid-state electrolytes is selected from the group consisting of polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), and combinations thereof.

4. The method of claim 1, wherein the one or more electrodes are heated to a temperature greater than or equal to about 50° C. to less than or equal to about 300° C.

5. The method of claim 1, wherein the method further comprises:
forming a solid-state electrolyte layer on an exposed surface of the solid-state electroactive material layer, wherein the solid-state electrolyte layer is formed by a plurality of solid-state electrolyte particle and the solid-state electrolyte layer is also impregnated with the solid-state electrolyte precursor solution.

6. The method of claim 5, wherein the plurality of apertures extend continuously through solid-state electrolyte layer, the solid-state electroactive material layer, and the current collector.

7. The method of claim 1, wherein the one or more electrodes comprise at least one positive electrode and at least one negative electrode and the method further comprises stacking the at least one positive electrode and the at least one negative electrode so as to form the solid-state electrochemical cell, wherein any void or pore within the solid-state electrochemical cell is also impregnated with the solid-state electrolyte precursor solution.

8. The method of claim 7, wherein a separator is disposed between the at least one positive electrode and the at least one negative electrode, wherein the separator is also impregnated with the solid-state electrolyte precursor solution.

9. The method of claim 8, wherein a solid-state electrolyte layer is disposed between the separator and the at least one positive electrode, wherein the solid-state electrolyte layer is formed by a plurality of solid-state electrolyte particle and the solid-state electrolyte layer is also impregnated with the solid-state electrolyte precursor solution.

10. The method of claim 8, wherein a solid-state electrolyte layer is disposed between the separator and the at least one negative electrode, wherein the solid-state electrolyte layer is formed by a plurality of solid-state electrolyte particle and the solid-state electrolyte layer is also impregnated with the solid-state electrolyte precursor solution.

11. The method of claim 7, wherein a first solid-state electrolyte layer is disposed adjacent to the at least one positive electrode and a second solid-state electrolyte layer is disposed adjacent to the at least one negative electrode, and the first and second solid-state electrolyte layers are also impregnated with the solid-state electrolyte precursor solution, and
wherein the first solid-state electrolyte layer comprises a first plurality of solid-state electrolyte particles and the second solid-state electrolyte layer comprises a second plurality of solid-state electrolyte particles, and the first plurality of solid-state electrolyte particles is the same or different from the second plurality of solid-state electrolyte particles.

12. The method of claim 11, wherein the plurality of apertures comprises:
a first plurality of apertures that extends continuously through the first solid-state electrolyte layer and the at least one positive electrode; and
a second plurality of apertures that extends continuously through the second solid-state electrolyte layer and the at least one negative electrode.

13. The method of claim 11, wherein a separator is disposed between the first solid-state electrolyte layer and the second solid-state electrolyte layer, wherein the separator is also impregnated with the solid-state electrolyte precursor solution.

14. A method for preparing a solid-state electrochemical cell having a distributed solid-state electrolyte, the method comprising:
disposing a first solid-state electroactive material layer adjacent a first current collector so as to form a first electrode;
forming a first plurality of apertures within the first electrode, wherein the first plurality of apertures extends continuously through the first solid-state electroactive material layer and the first current collector;
disposing a second solid-state electroactive material layer adjacent a second current collector so as to form a second electrode;
forming a second plurality of apertures within the second electrode, wherein the second plurality of apertures extends continuously through the second solid-state electroactive material layer and the second current collector;
stacking the first and second electrodes so as to form the solid-state electrochemical cell;
impregnating the solid-state electrochemical cell with a solid-state electrolyte precursor solution so as to fill the first and second pluralities of apertures and any other void or pore within the solid-state electrochemical cell with the solid-state electrolyte precursor solution; and
heating the solid-state electrolyte precursor solution so as to solidify the solid-state electrolyte precursor solution and to form the distributed solid-state electrolyte.

15. The method of claim 14, wherein one or more solid-state electrolyte layers are disposed between the first electrode and the second electrode, wherein each of the one or more solid-state electrolyte layers is formed by a plurality of solid-state electrolyte particle and the one or more solid-state electrolyte layers are also impregnated with the solid-state electrolyte precursor solution.

16. The method of claim 15, wherein the one or more solid-state electrolyte layers comprises:
a first solid-state electrolyte layer disposed adjacent to an exposed surface of the first solid-state electroactive material layer, wherein the first plurality of apertures extends continuously through the first solid-state electroactive material layer, the first current collector, and the first solid-state electrolyte layer; and
a second solid-state electrolyte layer disposed adjacent to an exposed surface of the second solid-state electroactive material layer, wherein the second plurality of apertures extends continuously through the second solid-state electroactive material layer, the second current collector, and the second solid-state electrolyte layer.

17. The method of claim 14, wherein a separator is disposed between the first electrode and the second electrode, wherein the separator is also impregnated with the solid-state electrolyte precursor solution.

* * * * *